UNITED STATES PATENT OFFICE 2,655,511

1-PYRROLIDYL ESTERS

Eugene H. Woodruff, Kalamazoo, Mich., assignor to The Upjohn Company, Kalamazoo, Mich., a corporation of Michigan No Drawing. Application November 18, 1950, Serial No. 196,525

6 Claims. (Cl. 260—326.3)

This invention relates to 1-pyrrolidyl esters having the formula:

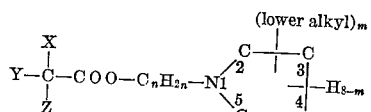

in which X is hydrogen or an alkyl radical, Y is a monocyclic hydrocarbon radical, e. g., an aryl, aralkyl, cycloalkyl, or cycloalkenyl radical, Z is an alkyl or a monocyclic hydrocarbon radical, e. g., an aryl, aralkyl, cycloalkyl or cycloalkenyl radical, $m$ is an integer from 0 to 4, inclusive, and $n$ is an integer from 2 to 4, inclusive, and acid addition and quaternary ammonium salts thereof. In all of the compounds of my invention the pyrrolidyl radical is joined to the adjacent $C_nH_{2n}$ group through the nitrogen atom of the pyrrolidyl nucleus, and for simplicity in naming the compounds, they are referred to herein as 1-pyrrolidyl derivatives.

This application is a continuation-in-part of my prior copending application Serial 21,561, filed April 16, 1948, which in turn is a continuation-in-part of my application Serial 667,492, filed May 4, 1946, both now abandoned.

The esters of the present invention are oily liquids which are readily soluble in most organic solvents, but difficultly soluble in water. The hydrochlorides, hydrobromides, sulfates, benzoates, nitrobenzoates, acetates, succinates, citrates, nitrates, p-toluenesulfonates and other acid addition salts of the esters are generally crystalline solids having well-defined melting points. They are soluble to varying degrees in water, ethyl acetate and lower aliphatic alcohols at ordinary temperatures.

Members of this new group of compounds have been prepared and found to have value as antispasmodics and as intermediates for the preparation of more complex organic compounds. These compounds have exhibited most desirable antispasmodic properties, having effects similar to that of both atropine and papaverine. Atropine is considered to be a neurotropic agent, acting upon the smooth muscle tissue to overcome spasm originated by or produced through the autonomic nervous system. Papaverine, an opium alkaloid, is considered to be a musculotropic agent capable of acting on smooth muscle tissues directly to relieve spasm intrinsic in the muscle tissues.

In clinical practice it is not always possible to determine which type of spasm is present. Furthermore, both types may be present, simultaneously presenting a situation in which an antispasdomic agent effective against only a single type is of limited utility. The compounds with which the present invention is concerned possess both musculotropic and neurotropic activity, and, upon administration, exhibit a dual antispasmodic effectiveness of sufficient degree to render them useful in treating either of the previously mentioned types of spasm, or both simultaneously, if they should be present.

The free basic esters of the invention can be prepared readily by reacting an acid chloride having the formula:

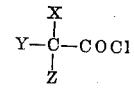

with a (1-pyrrolidyl)alkanol (which is also designated a 1-(hydroxyalkyl)tetrahydropyrrole) having the formula:

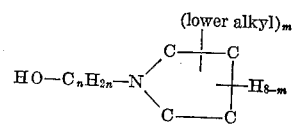

in which X, Y, Z, $m$ and $n$ have the significance specified hereinbefore. The corresponding acid bromides can also be used, if desired, although the preparation of compounds of this invention will be described with particular reference to the acid chlorides. The specified acid chlorides can be prepared readily and in excellent yields by heating the corresponding acid with thionyl chloride for a period of from one to several hours at the reflux temperature of the mixture. An excess of thionyl chloride is usually employed and the excess can subsequently be removed by distillation in vacuo leaving the acid chloride as a residue, generally sufficiently pure for use without further purification, but it can be fractionally distilled, if greater purity is desired. Acid bromides can be prepared in similar fashion using thionyl bromide.

(1-pyrrolidyl)alkanols used for the production of the esters of the invention can be prepared in several ways. Thus, a suitable haloalkanol can be reacted with pyrrolidine or with a C-alkyl-substituted pyrrolidine and the desired (1-pyrrolidyl)alkanol obtained. In certain instances, it is advantageous first to condense pyrrolidine or a C-alkyl-pyrrolidine with a suitable halo-ketone, halo-aldehyde, an ester of a suitable saturated halo-aliphatic acid, or an ester of a suitable alpha, beta-unsaturated aliphatic acid to form the corresponding 1-pyrrolidyl compound. In some instances, it may be of advantage to condense a suitable amino alcohol with an alkyl-substituted succinic acid to form an N(hydroxyalkyl) alkylsuccinimide, or with a suitable gamma-keto acid (levulinic acid, for example) and reduce the product to form an N(hydroxyalkyl)-pyrrolidone-2. The compounds thus obtained are then reacted with lithium aluminum hydride in absolute ether to produce the desired (1-pyrrolidyl) alkanols. Other (1-pyrrolidyl) alkanols may be prepared by condensing a suitable pyrrolidine with a suitable aliphatic aldehyde to give the desired (1-pyrrolidyl) alkanol. Certain of the (1-pyrrolidyl) alkanols referred to herein and methods for their preparation are described by Reid et al. in J. Am. Chem. Soc. 70, page 3100 (1949); by Moffett, in J. Org. Chem. 14, 862 (1949); and in my copending application Serial No. 773,522, filed September 11, 1947, now U. S. Patent 2,552,502, issued May 8, 1951.

The reaction of an acid chloride and a (1-pyrrolidyl) alkanol to form an ester of the invention can be carried out conveniently by mixing the two substances together, either with or without the addition of an inert diluent such as dry xylene or other hydrocarbon solvent. Reaction usually occurs at ordinary temperatures and can be accelerated and carried substantially to completion by finally refluxing the mixture for about thirty minutes or longer. Upon allowing the reaction mixture to cool, the hydrochloride of the basic ester generally crystallizes and can be separated from most of any inert diluent used, by filtration. The free ester can be recovered and purified by dissolving the crude hydrochloride in water, extracting the solution with ether or other water-immiscible solvent to remove any remaining inert diluent or other water-insoluble substance, and finally alkalizing the solution with sodium carbonate or other alkali. The alkaline mixture is then extracted with ether or other suitable organic liquid and the extract eventually evaporated to drive off the solvent and recover the free basic esters. The free basic esters can be distilled at subatmospheric pressure to purify them, if greater purity is desired.

Salts of the basic esters with acids, such as with hydrochloric, hydrobromic, hydriodic, sulfuric, phosphoric, acetic, succinic, propionic, benzoic, citric, lactic, nitro-benzoic, picric, nitric, p-toluenesulfonic and other acids, can be prepared readily by reacting the ester and the acid in a solvent such as alcohol or a mixture of ethyl alcohol and ethyl acetate. Upon evaporation of the solvent, the salt remains as a residue, and can be recrystallized from alcohol or other suitable organic liquid; a mixture of ethyl alcohol and ethyl acetate is particularly suitable for recrystallization. Salts with certain inorganic acids, especially with hydrochloric acid, are of particular value because of their well-defined crystalline nature. Citric acid and other dibasic and tribasic acids combine with the basic esters in equimolecular proportions to form monoamino salts, whereas other dibasic and tribasic acids combine in accordance with their acid equivalences.

In addition to salts with acids, the basic esters of the present invention also form quaternary ammonium salts with alkyl halides. With methyl iodide, the methiodide salt is formed, and similar quaternary ammonium salts form with other alkyl halides. Representative compounds which can be used to form these salts are, for example, benzyl chloride, ethyl bromide, methyl iodide, propyl bromide, ethyl chloride, allyl bromide, etc.

The quaternary ammonium salts prepared from the basic alkyl esters of the invention are generally well-defined crystalline compounds having sharp melting points, which are soluble to varying degrees in many organic solvents and are generally very soluble in water.

Although the preferred basic esters of the invention are esters of disubstituted acetic acids (in which X of the general formula is hydrogen), it is to be understood that esters of other saturated alpha, alpha-disubstituted aliphatic acids, having either straight or branched carbon chains, are included within the scope of the invention. Such acids include alpha, alpha-disubstituted propionic, n-butyric, n-valeric, isovaleric, n-caproic, isobutylacetic, sec-butylacetic, tert-butylacetic, pelargonic and other aliphatic acids. Generally disubstituted products of aliphatic acids having less than 10 carbon atoms in the molecule are preferred, but the invention is not to be limited in this respect.

As stated hereinbefore, one or two of the substituents (X and Z of the formula) on the alpha carbon atom of the aliphatic acid component of the esters of the invention can be an alkyl radical, and at least one (Y of the formula) of the substituents must be an aryl, aralkyl, cycloalkyl or cycloalkenyl radical. Alkyl radicals, present as one of the substituents on the alpha carbon atom, can have either a straight or branched carbon chain and include methyl, ethyl, n-propyl, isopropyl, n-butyl, isobutyl, sec-butyl, hexyl, dodecyl, and many others. Generally speaking, an alkyl radical containing not more than 12 carbon atoms is preferred, although the invention is not limited in this respect. Other substituent radicals which can be present on the alpha carbon atom of the acid component include, among many others, phenyl, naphthyl, o-tolyl, p-tolyl, xylyl, benzyl, methylbenzyl, diphenylmethyl, cyclohexyl, methylcyclohexyl, propylcyclohexyl, cyclohexenyl, methylcyclohexenyl, cyclopentyl and cyclopentenyl radicals.

The (1-pyrrolidyl)alkanol used in preparing the esters of the invention can be a (1-pyrrolidyl)ethanol, a (1-pyrrolidyl)propanyl, or a (1-pyrrolidyl)butanol. The carbon chain of the group, —$C_nH_{2n}$—, can be either straight or branched. The pyrrolidine ring can either be unsubstituted or it may contain up to 4-loweralkyl substituents on its carbon atoms. Representative lower-alkyl radical substituents are methyl, ethyl, propyl, isopropyl, butyl, tertiarybutyl, and other alkyl radicals having up to and including 6 carbon atoms. Representative (1-pyrrolidyl)alkanols which, among others, can be used in preparing esters of the invention include beta-(1-pyrrolidyl)ethanol, beta-(1-pyrrolidyl)butanol, beta-(1-pyrrolidyl)isopropanol, beta - (1 - pyrrolidyl) - n - propanol, alpha - (1-pyrrolidyl)ethanol, alpha - (1 - pyrrolidyl)isobutanol, beta - (2 - methyl - 1 - pyrrolidyl)ethanol, gamma-(1-pyrrolidyl)propanol, beta-(3-methyl-1-pyrrolidyl)propanol, gamma-(2,3-dimethyl-1-pyrrolidyl)propanol, alpha - (2,5-methyl - 1 - pyrrolidyl)butanol, beta-(2,3-dimethyl-1-pyrrolidyl)-n-butanol, beta-(1-pyrmethyl-1-pyrrolidyl)butanol, and beta-(1-pyrrolidyl)isobutanol.

Although the preferred method for preparing the compounds of the invention comprises reacting an alpha,alpha-disubstituted aliphatic acid chloride with a (1-pyrrolidyl)alkanol, because of the high yield of pure product obtained, it should be pointed out that they can also be prepared in other conventional ways. Thus, an alkali-metal salt of an alpha,alpha-disubstituted aliphatic acid can be heated with a suitable (1-pyrrolidyl)alkyl halide, preferably in a solvent such as ethanol, isopropyl ether or butanol, and the desired ester isolated from the reaction product.

Free basic esters contemplated by the invention include, among many others, beta-(1-pyrrolidyl)ethyl alpha,alpha - diphenylacetate, gamma - (1 - pyrrolidyl)propyl alpha,alpha - diphenylacetate, beta - (1 - pyrrolidyl) - 1 - methylethyl alpha,alpha-diphenylacetate, beta-(1-pyrrolidyl) - n - propyl alpha,alpha - diphenylacetate, beta-(1-pyrrolidyl)ethyl alpha,alpha-dicyclohexylacetate, beta-(1-pyrrolidyl)ethyl alpha,alpha - dicyclopentenylacetate, beta - (1-pyrrolidyl)ethyl alpha,alpha - dibenzylacetate, beta - (1 - pyrrolidyl)ethyl alpha - phenyl - alpha-cyclopentylacetate, gamma-(1-pyrrolidyl)propyl alpha-phenyl-alpha-cyclopentylacetate, beta - (1 - pyrrolidyl)isopropyl alpha-phenyl-alpha-cyclopentylacetate, beta-(1-pyrrolidyl)-n-propyl alpha-phenyl-alpha-cyclopentylacetate, beta - (1 - pyrrolidyl)ethyl alpha - phenyl - alpha(delta-2-cyclopentenyl)-acetate, gamma-(1-pyrrolidyl)propyl alpha-phenyl-alpha-(delta-2-cyclopentenyl)acetate, beta - (1 - pyrrolidyl)isopropyl alpha - phenyl - alpha - (delta - 2 - cyclopentyl)acetate, beta-(1-pyrrolidyl)-n-propyl alpha - phenyl - alpha - (delta - 2 - cyclopentenyl)acetate, gamma-(1-pyrrolidyl)-n-butyl alpha - phenyl - alpha - benzylpropionate, gamma(1 - pyrrolidyl)isobutyl alpha - phenyl-alpha-cyclohexylbutyrate, beta-(1-pyrrolidyl)isobutyl alpha-phenyl-alpha(delta-2-cyclohexenyl)acetate, alpha-(1-pyrrolidyl)-n-propyl alpha-phenyl - alpha - cyclohexylbutyrate, beta - (2,3-dimethyl - 1 - pyrrolidyl)ethyl alpha - butyl-beta-cyclohexylvalerate, beta-(2,4 - dimethyl-1-pyrrolidyl)-n-propyl alpha-ethyl-beta-phenylacetate, delta - (3,4 - dimethyl - 1 - pyrrolidyl) - n-butyl alpha - methyl - beta - cyclopentenylacetate, alpha-(2-methyl-1-pyrrolidyl)ethyl alpha-benzyl-beta-cyclohexylpropionate, and gamma- (2 - methyl - 1 - pyrrolidyl)propyl alpha-benzyl-beta-cyclohexylpropionate.

Methods by which the compounds of the present invention may be prepared are disclosed in the following Preparations and Examples, which are given by way of illustration only and are not to be construed as limiting.

PREPARATION 1.—ETHYL ALPHA-(1-PYRROLIDYL) PROPIONATE ($CH_3$—$CH(NC_4H_8)$—$COOC_2H_5$)

One hundred forty-eight grams (approximately 2.1 moles) of pyrrolidine was added portionwise to a mixture of 181 grams (approximately 1 mole) of ethyl alpha-bromopropionate ($CH_3CHBrCOOC_2H_5$) and 200 milliliters of dry benzene. A vigorous exothermic reaction occurred immediately, causing the benzene to boil. After all the pyrrolidine had been added, the mixture was refluxed for an additional hour. The mixture was then poured onto ice, acidified with dilute hydrochloric acid and the aqueous layer separated. The aqueous layer was extracted once with ether and then alkalized with cold aqueous sodium hydroxide. The alkaline solution was then extracted with ether and the ethereal extract washed with water and dried. The ether was then evaporated and the residual oil fractionally distilled in vacuo. There was thus obtained 64.1 grams of ethyl alpha-(1-pyrrolidyl) propionate, boiling at 84 degrees centigrade under a pressure of 12 millimeters of mercury and having an index of refraction, $(n_D^{25})$ of 1.4450, and a density $(d_4^{25})$ of 0.9724.

Analysis.—Calculated: 8.18% N. Found: 8.21% N.

PREPARATION 2.—BETA-(1-PYRROLIDYL)PROPANOL ($CH_2OH$—$CH(NC_4H_8)$—$CH_3$)

A mixture of 7.6 grams of lithium aluminum hydride and 250 milliliters of dry ether was prepared and 61.7 grams (approximately 0.36 mole) of ethyl alpha-(1-pyrrolidyl)propionate (prepared as described in Preparation 1) was added slowly to the mixture so as to cause gentle refluxing of the ether. The mixture was then allowed to stand for a few minutes without cooling and 20 milliliters of water was added dropwise. The mixture was then cooled by adding ice and was acidified with hydrochloric acid. The aqueous layer was separated, washed with ether and then rendered strongly alkaline with sodium hydroxide. The basic solution was then extracted repeatedly with ether and the ethereal extracts combined and dried with anhydrous potassium carbonate. The ether was then evaporated and the residual oil fractionally distilled. There was thus obtained 38.1 grams of beta-(1-pyrrolidyl)propanol, boiling at 80 degrees centigrade at a pressure of 11 millimeters of mercury absolute and having an index of refraction, $(n_D^{25})$ of 1.4758 and a density $(d_4^{25})$ of 0.9733.

Analysis. — Calculated: 10.84% N. Found: 10.96% N.

Neutral equivalent. — Calculated: 10.84. Found: 10.96.

PREPARATION 3.—GAMMA(1-PYRROLIDYL)PROPANOL ($CH_2OH$—$CH_2$—$CH_2$—$NC_4H_8$)

A mixture was prepared consisting of 50.7 grams of sodium hydroxide, 45.7 grams of water and 60.5 grams (approximately 0.86 mole) of pyrrolidine. The mixture was stirred vigorously and 100 grams (approximately 1.06 moles) of 3-chloropropanol-1 was slowly added to the mixture. The temperature of the mixture rose gradually and was maintained between about 75 degrees centigrade and about 100 degrees centigrade during the addition. The mixture was then stirred for an additional thirty minutes and finally allowed to stand for several hours. Solid sodium hydroxide was then added until the mixture was saturated; the oily layer which formed was separated. The aqueous layer was extracted with benzene and the combined oily layer and benzene extract was fractionally distilled. A fraction was collected consisting of 65.5 grams of gamma-(1-pyrrolidyl)propanol, boiling at 115 degrees centigrade under a pressure of 43 millimeters of mercury absolute and having an index of refraction $(n_D^{25})$ of 1.4701.

PREPARATION 4.—N-(2-HYDROXYETHYL)-ALPHA-METHYLSUCCINIMIDE

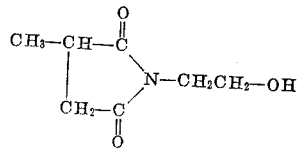

A mixture of 66 grams (approximately 0.5 mole) of methylsuccinic acid (pyrotartaric acid) and 73.4 grams (approximately 1.2 moles) of monoethanolamine was heated by means of an oil bath, the temperature of the mixture gradually rising to 260 degrees centigrade, until distillation ceased. The residue was distilled under a reduced pressure of about one millimeter of mercury absolute to obtain a viscous oil which, upon fractional distillation, yielded 67.3 grams (86.4 per cent of the theoretical yield) of N-(2-hydroxyethyl)-alpha-methylsuccinimide, boiling at 102 degrees centigrade at a pressure of 0.01 millimeter of mercury absolute; and having an index of refraction ($n_D^{25}$) of 1.4970.

PREPARATION 5.—2-(3-METHYL-1-PYRROLIDYL) ETHANOL

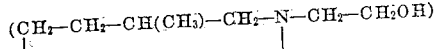

A solution of 62.8 grams (approximately 0.4 mole) of N-(2-hydroxyethyl)-alpha-methylsuccinimide (prepared as described in Preparation 4) in 100 milliliters of dry ether was added to a suspension of 30 grams of lithium aluminum hydride in 500 milliliters of ether at a rate such as to cause gentle refluxing of the ether. The mixture was then allowed to stand for a few minutes without cooling and 20 milliliters of water was added dropwise. The mixture was cooled to about ten degrees centigrade by adding ice and thereafter was acidified with aqueous hydrochloric acid. The aqueous layer was separated, washed with ether, and made strongly alkaline with concentrated sodium hydroxide. The basic solution was then extracted repeatedly with ether, the ethereal extracts combined, dried with anhydrous potassium carbonate, the ether removed, and the residual oil fractionally distilled. There was thus obtained 35 grams of 2-(3-methyl-1-pyrrolidyl)-ethanol, distilling at 105 degrees centigrade at a pressure of 45 millimeters of mercury, and having a refractive index ($n_D^{25}$) of 1.4640.

PREPARATION 6.—OTHER 1-PYRROLIDYL ALKANOLS

By procedures similar to those described in Preparations 4 and 5, the following 1-pyrrolidyl alcohols were prepared:

(1) 2-(3,3-dimethyl-1-pyrrolidyl) ethanol

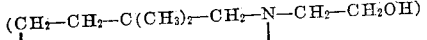

boiling at 81 degrees centigrade at a pressure of 13 millimeters of mercury absolute, index of refraction ($n_D^{25}$) of 1.4580.

(2) 2-(3,4-dimethyl-1-pyrrolidyl) ethanol

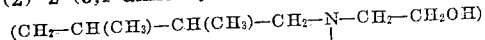

boiling at 86 degrees centigrade at a pressure of 12 millimeters of mercury absolute, index of refraction ($n_D^{25}$) of 1.4594.

(3) 2-(2,3-dimethyl-1-pyrrolidyl) ethanol

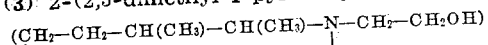

boiling at 86 degrees centigrade at a pressure of 13 millimeters of mercury absolute, index of refraction ($n_D^{25}$) of 1.4661.

(4) 3-(2-methyl-1-pyrrolidyl) propanol-1

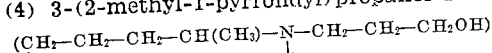

boiling at 100 degrees centigrade at a pressure of 18 millimeters of mercury absolute, index of refraction ($n_D^{25}$) of 1.4672.

The preparation of other 1-pyrrolidyl alkanols is described hereinafter.

PREPARATION 7.—1-(2-HYDROXYETHYL)-5-METHYL-PYRROLIDON-2

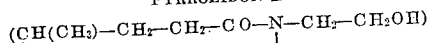

Approximately 0.2 gram of platinum oxide catalyst in suspension in 25 milliliters of absolute ethanol was reduced to platinum, a solution of 34.3 grams (approximately 0.3 mole) of levulinic acid ($CH_3CO(CH_2)_2COOH$) and 37.8 grams (approximately 0.62 mole) of ethanolamine in 75 milliliters of absolute alcohol was added, and the mixture was hydrogenated at about 50 pounds pressure and room temperature for about four hours, after which time the theoretical amount of hydrogen had been absorbed. After removing the catalyst and solvent, the residue was fractionally distilled. There was thus obtained 42.5 grams (100 per cent of the theoretical yield) of 1-(2-hydroxyethyl)-5-methylpyrrolidone-2, boiling at 167 degrees centigrade at a pressure of 12 millimeters of mercury absolute, and having an index of refraction ($n_D^{25}$) of 1.4883. Bachman and Mayhen, J. Org. Chem. 10, 243 (1945), alkylated 5-methylpyrrolidone-2 with ethylene chlorohydrin and obtained a product having somewhat different physical constants.

PREPARATION 8.—2-(2-METHYL-1-PYRROLIDYL) ETHANOL

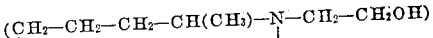

By a procedure similar to that described in Preparation 5, fifty-one grams of 1-(2-hydroxyethyl)-5-methylpyrrolidone-2 (Preparation 7) was reduced with 18 grams of lithium aluminum hydride in 400 milliliters of ether. Distillation gave 35 grams (76 percent of the theoretical yield) of 2-(2-methyl-1-pyrrolidyl) ethanol, boiling at 81 degrees centigrade at a pressure of sixteen millimeters of mercury absolute; and having an index of refraction ($n_D^{25}$) of 1.4680.

PREPARATION 9.—2-METHYL-2-ETHYLOXAZOLIDINE

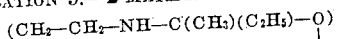

A mixture of 223.5 grams (approximately 3.1 moles) of methyl ethyl ketone, 183.3 grams of ethanolamine (approximately 3.0 moles) and 500 milliliters of benzene were heated in a reaction flask equipped with a distillation condenser. The collected distillate was separated into two layers, the organic layer of which was returned to the reaction flask. This procedure was continued until no more water collected in the distillate. After removing the benzene by distillation, 232.9 grams (67.3 percent of the theoretical yield) of 2-methyl-2-ethyloxazolidine was obtained.

PREPARATION 10.—N-2-ETHANOL-N-(1-METHYL-1-ETHYL-3-BUTENYL) AMINE

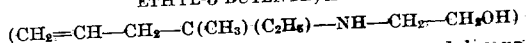

Allylmagnesium bromide was prepared by reacting 242 grams (approximately 2.0 moles) of allyl bromide with 145.8 grams (approximately 6.0 moles) of magnesium in 1500 milliliters of ether. The mixture was distilled to remove one liter of ether, and one liter of tetrahydrofuran was thereafter added. 2-methyl-2-ethyloxazolidine (approximately 0.9 mole prepared as described in Preparation 9) in 200 milliliters of anhydrous ether was added dropwise to the allylmagnesium bromide over a period of about two hours. After the addition of the oxazolidine was completed, one liter of the solvent was removed by distillation and the residue allowed to stand overnight. Thereafter, approximately 400 milliliters of water was added to the mixture and the resulting mass filtered. The filtrate was continuously extracted with ether for about five hours. The ether extract was separated, acidified with aqueous hydrochloric acid, adjusted to a pH of 9.0 with aqueous sodium hydroxide, and the oily precipitate which formed was extracted with one 100-milliliter portion and three 25-milliliter portions of ether. The ether extracts were combined, dried over anhydrous potassium carbonate, the ether removed and the residue distilled at a reduced pressure of about 16 millimeters of mercury absolute. There was thus obtained 55.6 grams (35.3 percent of the theoretical yield) of N - 2 - ethanol - N - (1 - methyl - 1 - ethyl - 3 - butenyl) - amine, boiling at 113.5 degrees centigrade at 16 millimeters of pressure absolute. Its refractive index ($n_D^{20}$) was 1.470.

*Analysis.* — Calculated: 8.91% N. Found: 8.83% N.

PREPARATION 11.—2-(2-METHYL-2-ETHYL-1-PYRROLIDYL)ETHANOL

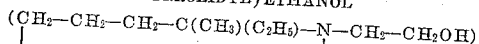
($CH_2$—$CH_2$—$CH_2$—$C(CH_3)(C_2H_5)$—N—$CH_2$—$CH_2OH$)

A mixture of 33.6 grams (0.21 mole) of bromine in 100 milliliters of chloroform was added to 32.5 grams (0.21 mole) of N - 2 - ethanol - N - (1 - methyl - 1 - ethyl - 3 - butenyl) amine (described in Preparation 10) in 100 milliliters of chloroform at a temperature below about forty degrees centigrade. The chloroform was removed by distillation, and the resulting organic product was dissolved in 150 milliliters of absolute ethanol, placed in a hydrogenation bomb with approximately five grams of platinum oxide catalyst, and hydrogen introduced thereinto for a period of seven hours while the temperature of the mixture was maintained between 25 and 40 degrees centigrade. Solvent and catalyst were removed by filtration and distillation, and the residue dissolved in water, heated to 80 degrees centigrade with activated charcoal, and the resulting mixture filtered. The pH of the mixture was adjusted to approximately 9.0 with dilute aqueous sodium hydroxide solution, extracted with one 100-milliliter portion and three 25-milliliter portions of ether, the extracts combined, dried over potassium carbonate, and the ether removed. There was thus obtained 14.8 grams (45 percent of the theoretical yield) of 2 - (2 - methyl - 2 - ethyl - 1 - pyrrolidyl) ethanol, boiling at 110.5 degrees centigrade at 15 millimeters of mercury absolute, having a refractive index ($n_D^{20}$) of 1.4590 and a density ($D_4^{20}$) of 0.9111.

*Analysis.* — Calculated: 8.91% N. Found: 8.81%; 9.09% N.

PREPARATION 12.—β,γ-DIMETHYL-γ-NITROVALERIC ACID ($CH_3$—$C(CH_3)(NO_2)$—$CH(CH_3)$—$CH_2$—COOH)

A mixture of 238.6 grams of 2,3 - dimethyl - 3 - nitrovaleronitrile (Buckley, Elliott, Hunt and Lowe, J. Chem. Soc. (London) 1947, 1505) and 1.5 liters of fifteen percent aqueous sodium hydroxide solution was refluxed for seven hours. The material was then acidified with dilute hydrochloric acid to a pH of about 2.5, extracted with one 250-milliliter portion of ether, and three 100-milliliter portions of ether, the extracts combined, dried over potassium carbonate, and the ether removed. The resulting material was purified by fractional distillation at a pressure of about 0.05 millimeter of mercury absolute. There was thus obtained 63.7 grams of 2,3 - dimethyl - 3 - nitrovaleric acid, boiling at 110 degrees centigrade at a pressure of 0.05 millimeter of mercury absolute. This material, when recrystallized from carbon tetrachloride and hexane, melted at 81.5–82 degrees centigrade.

*Analysis.*—

| | C | H | N | Neutral equivalent |
|---|---|---|---|---|
| Calculated for $C_7H_{13}NO_4$ | 48.00 | 7.50 | 8.00 | 175.2 |
| Found | 48.02 | 7.39 | 8.07 | 173.0 |

PREPARATION 13.—4,5,5-TRIMETHYLPYRROLIDONE-2

($C(CH_3)_2$—$CH(CH_3)$—$CH_2$—CO—NH)

A mixture of 57.6 grams of β,γ-dimethyl-γ-nitrovaleric acid (prepared as described in Preparation 12), 250 milliliters of absolute ethanol, and fifteen grams of Raney nickel was placed in a hydrogenation bomb and hydrogen introduced thereinto at a temperature of about 60 degrees centigrade and at a pressure of about 1000 pounds per square inch for a period of twelve hours. There was thus obtained 26.1 grams (65.3 percent of the theoretical yield) of 4,5,5-trimethylpyrrolidone-2, boiling at 135–136 degrees centigrade at a pressure of fifteen millimeters of mercury absolute; its melting point was 45–47 degrees centigrade.

*Analysis:* — Calculated: 11.01% N. Found: 11.02%; 10.86% N.

PREPARATION 14.—2,2,3-TRIMETHYLPYRROLIDINE ($CH_2$—$CH_2$—$CH(CH_3)$—$C(CH_3)_2$—NH)

A mixture of 4,5,5-trimethylpyrrolidone-2 (9.5 grams or approximately 0.5 mole) in 100 milliliters of tetrahydrofuran was added dropwise to 9.5 grams (approximately 0.25 mole) of lithium aluminum hydride in 200 milliliters of tetrahydrofuran maintained at reflux temperature. The mixture was thereafter refluxed for five hours and allowed to cool and left standing for sixteen hours. Approximately 500 milliliters of water and fifteen milliliters of concentrated hydrochloric acid were added to the mixture. The tetrahydrofuran was removed by distillation, the mixture washed with fifty milliliters of ether, made basic to a pH of 9.0 with aqueous sodium hydroxide, and thereafter distilled with steam. The distillate was saturated with potassium carbonate and extracted with one 250-milliliter and three 100-milliliter portions of ether. The ether extracts were combined, dried over potassium carbonate, the ether removed by distillation and the residue distilled. There was thus obtained 13.8 grams (60.8 percent of the theoretical yield) of 2,2,3-trimethylpyrrolidine, boiling at 128 degrees centigrade at 760 millimeters pressure of mercury absolute. Its refractive index ($n_D^{20}$) was 1.4400.

*Analysis*—Calculated: 12.38% N. Found: 12.08%; 11.93% N.

PREPARATION 15.—2-(2,2,3-TRIMETHYL-1-PYRROLIDYL) ETHANOL

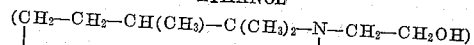
($CH_2$—$CH_2$—$CH(CH_3)$—$C(CH_3)_2$—N—$CH_2$—$CH_2OH$)

A mixture of 13.8 grams (approximately 0.12 mole) of 2,2,3-trimethylpyrrolidine and 9.8 grams (approximately 0.12 mole) of ethylene chlorohydrin were heated at 190 degrees centigrade for about two hours. The reaction mixture was shaken with 25 milliliters of fifty percent sodium hydroxide and thereafter extracted with one 100-milliliter and two fifty-milliliter portions of ether. The extracts were combined, dried over anhydrous potassium carbonate, and the ether removed by evaporation. On distillation of the residue there was obtained 13.6 grams (72.3 percent of the theoretical yield) of 2-(2,2,3-trimethyl-1-pyrrolidyl)ethanol having a boiling point of 98.5 degrees centigrade at a pressure of fifteen millimeters of mercury absolute; its refractive index ($n_D^{25}$) was 1.4666 and its density ($D_4^{25}$) was 0.93316.

*Analysis.*—Calculated: 8.91% N. Found: 9.23%; 9.38% N.

PREPARATION 16.—ETHYL ALPHA-(2,2-DIMETHYL-1-PYRROLIDYL) PROPIONATE

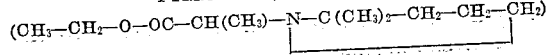

In a manner similar to that described in Preparation 1, 90.6 grams (approximately 0.5 mole) of ethyl alpha-bromopropionate was reacted with 44.8 grams (approximately 0.45 mole) of 2,2-dimethylpyrrolidine. There was thus obtained 38.3 grams (48 percent of the theoretical yield) of ethyl alpha-(2,2-dimethylpyrrolidyl)-propionate, having a boiling point of 99–101 degrees centigrade at thirteen millimeters of mercury absolute, and a refractive index ($n_D^{25}$) of 1.4223.

PREPARATION 17.—2-(2,2-DIMETHYL-1-PYRROLIDYL) PROPANOL

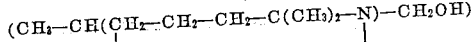

In a manner similar to that of Preparation 2, 38.3 grams (approximately 0.192 mole) of ethyl alpha-(2,2-dimethyl-1-pyrrolidyl)propionate (prepared as described in Preparation 16) was reacted with 7.6 grams (approximately 0.2 mole) of lithium aluminum hydride. There was thus obtained 12.7 grams (40.2 percent of the theoretical yield) of 2-(2,2-dimethyl-1-pyrrolidyl)-propanol, having a boiling point of 94 degrees centigrade at a pressure of sixteen millimeters of mercury, a refractive index ($n_D^{25}$) of 1.4582, and a density ($D_4^{25}$) of 0.9187.

*Analysis.*—Calculated: 8.91% N; $M_D$ 45.5. Found: 8.85%; 9.06% N; $M_D$ 47.0.

*Example 1.—Beta-(1-pyrrolidyl)ethyl alpha, alpha-diphenylacetate*

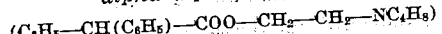

Forty-two and four-tenths grams (approximately 0.2 mole) of diphenylacetic acid was heated at reflux temperature with 71.4 grams (approximately 0.6 mole) of thionyl chloride for a period of one hour. The excess thionyl chloride was removed first by vacuum distillation on a steam bath, and thereafter three fifty-milliliter portions of dry benzene were added and the benzene was distilled out after each addition. One hundred milliliters of dry xylene was added to the resulting cooled diphenylacetyl chloride, followed by 23.0 grams (approximately 0.2 mole) of beta-(1-pyrrolidyl)ethanol in 50 milliliters of xylene. The reaction mixture, which separated rapidly into two layers, was refluxed for one-half hour and then allowed to stand overnight in a refrigerator.

The xylene was then decanted from the solid lower layer. The solid was dissolved into 250 milliliters of water, and the cloudy solution extracted with ether. The extracted solution was alkalized with saturated aqueous sodium carbonate solution, and extracted several times with ether. The extracts from the alkaline solution were combined and dried, and the ether distilled. The residual oil, consisting of beta-(1-pyrrolidyl)-ethyl diphenylacetate, was distilled in vacuo. It boiled at 168–176 degrees centigrade at 0.08 millimeter of mercury pressure absolute.

The basic ester was treated with absolute alcoholic hydrogen chloride, the alcohol was removed by evaporation, and the hydrochloride recrystallized from an ethyl acetate-alcohol mixture. The hydrochloride of beta-(1-pyrrolidyl)-ethyl diphenylacetate melts at 126–127 degrees centigrade, and is readily soluble in aqueous solvents. Analysis of beta-(1-pyrrolidyl)ethyl diphenylacetate hydrochloride:

|  | C | H | N | Cl |
|---|---|---|---|---|
| Calculated | 69.45 | 6.99 | 4.05 | 10.25 |
| Found | 69.73 | 6.72 | 4.35 | 10.11 |

*Example 2.—Beta-(1-pyrrolidyl)ethyl alpha-phenyl-alpha-(delta-2-cyclopentenyl)acetate*

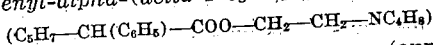

Thirty-five and one-tenth grams (approximately 0.174 mole) of alpha-phenyl-alpha-(delta-2-cyclopentenyl)acetic acid, obtained from phenyl malonic ester and delta-2-cyclopentenyl chloride and melting at 71 degrees centigrade, was treated with thionyl chloride to form the acid chloride as described in Example 1. One hundred grams of xylene was added, the solution was cooled to about 10 degrees centigrade, and a solution of 20 grams (approximately 0.174 mole) of beta-(1-pyrrolidyl)ethanol in 50 milliliters of xylene was added. The mixture was allowed to stand at room temperature for fifteen minutes and then heated at reflux for one-half hour. The mixture was cooled to room temperature, agitated thoroughly with 300 milliliters of water, and the xylene layer separated and discarded. After extracting twice with ether, the aqueous layer was alkalized with aqueous sodium carbonate and extracted several times with ether. The extracts from the alkaline solution were combined, dried, and the ether evaporated, and the residue distilled in vacuo. There was thus obtained beta-(1-pyrrolidyl)ethyl alpha-phenyl-alpha-(delta-2-cyclopentenyl)acetate, boiling at 140–150 degrees centigrade at 0.04 millimeter of mercury pressure absolute. Analysis of beta-(1-pyrrolidyl)ethyl alpha-phenyl-alpha-(delta-2-cyclopentenyl)acetate:

|  | C | H | N |
|---|---|---|---|
| Calculated | 76.22 | 8.42 | 4.68 |
| Found | 76.55 | 7.79 | 4.68 |

The hydrochloride, prepared in accordance with the general procedure described in Example 1 and crystallized from ethyl acetate, melted at 106.7–107 degrees centigrade.

Analysis of beta-(1-pyrrolidyl)ethyl alpha-phenyl-alpha-(delta-2-cyclopentenyl)acetate hydrochloride:

|  | C | H | N | Cl |
|---|---|---|---|---|
| Calculated | 67.94 | 7.80 | 4.18 | 10.56 |
| Found | 68.06 | 7.42 | 4.50 | 10.36 |

Alpha - phenyl - alpha - (delta - 2 - cyclopentenyl)acetyl chloride, prepared as described above, is a liquid having a boiling point of 78 degrees centigrade at a pressure of 0.1 millimeter of mercury and an index of refraction ($n_D^{21}$) of 1.5430.

*Analysis.*—Calculated: 16.07% Cl. Found: 15.02% Cl.

The monocitrate of beta-(1-pyrrolidyl)ethyl alpha - phenyl - alpha - (delta - 2 - cyclopentenyl)acetate was prepared as follows:

Approximately one molecular proportion of citric acid was dissolved in a hot mixture of ethyl acetate and methanol and the solution added to a hot solution of approximately one molecular proportion of distilled beta-(1-pyrrolidyl)ethyl alpha - phenyl - alpha - (delta - 2 - cyclopentenyl)acetate in ethyl acetate. The clear solution was allowed to cool, whereupon mono-(beta-(1-pyrrolidyl)ethyl alpha - phenyl - alpha - (delta - 2-cyclopentenyl)acetate) citrate separated in good yield in the form of crystals melting at 95.5–97 degrees centigrade.

*Anaylsis.*—Calculated: 2.85% N. Found: 2.86% N.

*Example 3.—Quaternary ammonium salts of beta-(1-pyrrolidyl)-ethyl alpha-phenyl-alpha-(delta-2-cyclopentenyl)acetate.*

The following quaternary ammonium salts of beta - (1 - pyrrolidyl)ethyl alpha - phenyl - alpha-(delta-2-cyclopentenyl)acetate (Example 2) were prepared by reaction of the ester with the appropriate alkyl halide. Their melting points were found to be as specified:

| | Melting point, degrees centigrade |
|---|---|
| Methobromide | 103.5–105.5 |
| Methiodide | 112.5–114.5 |
| Ethobromide | 129 –131 |
| Ethiodide | 127.5–129 |
| Allyl bromide | 117 –119 |

*Example 4.—Beta-(1-pyrrolidyl)ethyl alpha-phenyl-alpha-cyclopentylacetate*

($C_5H_9$—CH($C_6H_5$)—COO—$CH_2$—$CH_2$—$NC_4H_8$)

Thirty-six and one-tenth gram (0.174 mole) of alpha-phenyl-alpha-cyclopentylacetic acid, obtained by the catalytic reduction of alpha-phenyl-alpha-cyclopentenylacetic acid and melting at 99–100 degrees centigrade, was treated with thionyl chloride to form the acid chloride and the latter was then reacted with 20 grams (0.174 mole) of beta-(1-pyrrolidyl)-ethanol in accordance with the procedure of Example 1. The free basic ester boils at 135–141 degrees centigrade at 0.04 millimeter of mercury pressure absolute.

Analysis of beta-(1-pyrrolidyl)ethyl alpha-phenyl-alpha-cyclopentylacetate:

| | C | H | N |
|---|---|---|---|
| Calculated | 75.71 | 9.03 | 4.64 |
| Found | 74.35 | 8.69 | 4.50 |

The hydrochloride, prepared as in Example 1 and crystallized from ethyl acetate, melted at 101–102 degrees centigrade.

Analysis of beta-(pyrrolidyl-1)ethyl alpha-phenyl-alpha-cyclopentylacetate hydrochloride:

| | C | H | N | Cl |
|---|---|---|---|---|
| Calculated | 67.54 | 8.35 | 4.14 | 10.50 |
| Found | 67.12 | 8.12 | 4.36 | 10.61 |

Alpha-phenyl-alpha-cyclopentylacetyl chloride, prepared as above, is a liquid boiling at 74 degrees centigrade at a pressure of 0.1 millimeter of mercury and having an index of refraction ($n_D^{25}$) of 1.5308.

*Example 5.—2 - (2 - methyl - 1 - pyrrolidyl)ethyl α-phenyl-α-(delta-2-cyclohexenyl)acetate*

A solution of 125.7 grams of phenyl-(delta-2-cyclohexenyl)acetic acid (Kolloff, Hunter, Woodruff and Moffett, J. Am. Chem. Soc. 70, 3862 (1948)) and 73 milliliters of thionyl chloride was heated on a steam bath for one hour. After removal of the solvent, the residue was distilled through a short fractionating column whereupon 111 grams of 1-phenyl-1-(delta-2-cyclohexenyl)-acetyl chloride was obtained, distilling at 97 degrees centigrade at a pressure of 0.04 millimeter of mercury absolute and having an index of refraction ($n_D^{25}$) of 1.5478.

To a solution of 11.8 grams of the thus prepared acid chloride in 10 milliliters of dry benzene was added rapidly a solution of 7.75 grams of 2-(2-methyl-1-pyrrolidyl)-ethanol in 15 milliliters of dry benzene. After the initial reaction had subsided, the mixture was heated under reflux for an additional two hours, cooled, and shaken with ice water, ether, and 10 milliliters of hydrochloric acid. The aqueous layer was separated, extracted once with ether, and then made basic with cold sodium hydroxide solution. The insoluble product which separated was extracted with ether, the ether solution washed twice with water and once with saturated sodium chloride solution, dried, the solvent removed, and the residue fractionally distilled under a reduced pressure of less than 1 millimeter of mercury. There was thus obtained 14.8 grams of 2 - (2 - methyl - 1 - pyrrolidyl)ethyl α - phenyl - α - (delta - 2 - cyclohexenyl)acetate, distilling at 134 degrees centigrade at a pressure of 0.03 millimeter of mercury absolute, and having an index of refraction ($n_D^{25}$) of 1.5248.

*Analysis.*—Calculated for $C_{21}H_{29}NO_2$: 4.28% N. Found: 4.20% N.

A slight excess of dry hydrogen chloride was passed into a solution of 14.3 grams of the above base in absolute ether. 2-(2-methyl-1-pyrrolidyl)ethyl α-phenyl - α - (delta-2-cyclohexenyl)-acetate hydrochloride separated at once as an oil which solidified, and, after crystallization from methyl ethyl ketone, had a melting point of 146–148 degrees centigrade.

*Analysis.*—Calculated for $C_{21}H_{30}ClNO_2$: Cl, 9.74%. Found: Cl, 9.54%.

OTHER 1-PYRROLIDYL ESTERS

In a manner similar to that described in the foregoing examples, the following basic 1-pyrrolidyl esters and their salts were prepared by reaction of the appropriate (1-pyrrolidyl)alkanol and substituted acetic acid:

6. 2-(2-methyl-1-pyrrolidyl)ethyl α-phenyl-α-(delta-2-cyclopentenyl)acetate

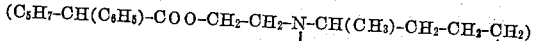

boiling point 150 degrees centigrade at a pressure of 0.2 millimeter of mercury; $n_D^{25}$, 1.5197. Hydrochloride, melting point 126–128.5 degrees centigrade after crystallization from ethyl acetate.

7. 2-(2-methyl-1-pyrrolidyl)ethyl α-phenyl-α-cyclopentyl-acetate (C₅H₉—CH(C₆H₅))—COO—CH₂—CH₂—N—CH(CH₃)—CH₂—CH₂—CH₂)

boiling point 125 degrees centigrade at a pressure of 0.02 millimeter of mercury; $n_D^{25}$, 1.5130. Hydrochloride, melting point 133–136 degrees centigrade after crystallization from a mixture of methyl ethyl ketone and ethyl acetate.

8. 2-(2-methyl-1-pyrrolidyl)ethyl α-cyclopentyl-α-propyl acetate (C₅H₉—CH(C₃H₇))—COO—CH₂—CH₂—N—CH(CH₃)—CH₂—CH₂—CH₂)

boiling point 89 degrees centigrade at a pressure of 0.02 millimeter of mercury; $n_D^{25}$, 1.4672. Hydrochloride, melting point 119.5–120.5 degrees centigrade after crystallization from a mixture of ethyl acetate and ether.

9. 2-(2-methyl-1-pyrrolidyl)ethyl α-butyl-α-(delta-2-cyclopentenyl)acetate (C₅H₇—CH(C₄H₉))—COO—CH₂—CH₂—N—CH(CH₃)—CH₂—CH₂—CH₂)

boiling point 103 degrees centigrade at a pressure of 0.02 millimeter of mercury; $n_D^{25}$, 1.4735. Hydrochloride, melting point 98.5–100 degrees centigrade after crystallization from an ethyl acetate-ether mixture.

10. 2-(2-methyl-1-pyrrolidyl)ethyl α-(delta-2-cyclohexenyl)-α-(delta-2-cyclopentenyl)acetate (C₅H₇—CH(C₆H₉))—COO—CH₂—CH₂—N—CH(CH₃)—CH₂—CH₂—CH₂)

boiling point 130 degrees centigrade at a pressure of 0.02 millimeter of mercury; $n_D^{25}$, 1.5022. Hydrochloride, melting point 107–110 degrees centigrade after crystallization from ethyl acetate.

11. 3-(2-methyl-1-pyrrolidyl)propyl α-phenyl-α-(delta-2-cyclopentenyl)acetate (C₅H₇—CH(C₆H₅))—COO—CH₂—CH₂—CH₂—N—CH(CH₃)—CH₂—CH₂—CH₂)

boiling point 132 degrees centigrade at a pressure of 0.01 millimeter of mercury; $n_D^{25}$, 1.5169. Hydrochloride, melting point 166–167 degrees centigrade after crystallization from an ethyl acetate-ether mixture.

12. 3-(2-methyl-1-pyrrolidyl)propyl α-propyl-α-cyclopentylacetate (C₅H₉—CH(C₃H₇))—COO—CH₂—CH₂—CH₂—N—CH(CH₃)—CH₂—CH₂—CH₂)

boiling point 117 degrees centigrade at a pressure of 0.03 millimeter of mercury; $n_D^{25}$, 1.4674. Hydrochloride, melting point 167–169 degrees centigrade after crystallization from an ethyl acetate-ether mixture.

13. 2-(3-methyl-1-pyrrolidyl)ethyl α-phenyl-α-(delta-2-cyclopentenyl)acetate (C₅H₇—CH(C₆H₅))—COO—CH₂—CH₂—N—CH₂—CH(CH₃)—CH₂—CH₂)

boiling point 121 degrees centigrade at a pressure of 0.01 millimeter of mercury; $n_D^{25}$, 1.5238. Hydrochloride, melting point 102–106 degrees centigrade after crystallization from an ethyl acetate-ether mixture.

14. 2-(3-methyl-1-pyrrolidyl)ethyl α-phenyl-α-(delta-2-cyclohexenyl)acetate (C₆H₉—CH(C₆H₅))—COO—CH₂—CH₂—N—CH₂—CH(CH₃)—CH₂—CH₂)

boiling point 133 degrees centigrade at a pressure of 0.01 millimeter of mercury; $n_D^{25}$, 1.5238. Hydrochloride, melting point 120–123 degrees centigrade after crystallization from an ethyl acetate-ether mixture.

15. 2-(3-methyl-1-pyrrolidyl)ethyl α-propyl-α-cyclopentylacetate (C₅H₉—CH(C₃H₇))—COO—CH₂—CH₂—N—CH₂—CH(CH₃)—CH₂—CH₂)

boiling point 87 degrees centigrade at a pressure of 0.01 millimeter of mercury; $n_D^{25}$, 1.4660. Hydrochloride, melting point 96.5–98 degrees centigrade after crystallization from an ethyl acetate-ether mixture.

16. 2-(3-methyl-1-pyrrolidyl)ethyl α-(delta-2-cyclopentenyl)-α-(delta-2-cyclohexenyl)-acetate (C₅H₉—CH(C₆H₇))—COO—CH₂—CH₂—N—CH₂—CH(CH₃)—CH₂—CH₂)

boiling point 126 degrees centigrade at a pressure of 0.01 millimeter of mercury; $n_D^{25}$, 1.5012. Hydrochloride, melting point 99–100 after crystallization from an ethyl acetate-ether mixture.

17. 2-(2,5-dimethyl-1-pyrrolidyl)ethyl α-phenyl-α-(delta-2-cyclopentenyl)acetate (C₅H₇—CH(C₆H₅)—COO—CH₂—CH₂—N—CH(CH₃)—CH₂—CH₂—CH(CH₃))

boiling point 131 degrees centigrade at a pressure of 0.02 millimeter of mercury; $n_D^{25}$, 1.5153. Hydrochloride, melting point 117.5–122.5 after crystallization from ethyl acetate.

18. 2-(2,5-dimethyl-1-pyrrolidyl)ethyl α-phenyl-α-cyclopentylacetate (C₅H₉—CH(C₆H₅)—COO—CH₂—CH₂—N—CH(CH₃)—CH₂—CH₂—CH(CH₃))

boiling point 138 degrees centigrade at a pressure of 0.06 millimeter of mercury; $n_D^{25}$, 1.5089. Hydrochloride, melting point 135.5–136.5 degrees centigrade after crystallization from methyl ethyl ketone.

19. 2-(2,5-dimethyl-1-pyrrolidyl)ethyl α-phenyl-α-(delta-2-cyclohexenyl)acetate (C₆H₉—CH(C₆H₅)—COO—CH₂—CH₂—N—CH(CH₃)—CH₂—CH₂—CH(CH₃))

boiling point 145 degrees centigrade at a pressure of 0.03 millimeter of mercury; $n_D^{25}$, 1.5202. Hydrochloride, melting point 123–128 degrees centigrade after crystallization from a mixture of methyl ethyl ketone and ethyl acetate.

20. 2-(2,5-dimethyl-1-pyrrolidyl)ethyl α-cyclopentyl-α-propylacetate (C₅H₉—CH(C₃H₇)—COO—CH₂—CH₂—N—CH(CH₃)—CH₂—CH₂—CH(CH₃))

boiling point 113 degrees centigrade at a pressure of 0.07 millimeter of mercury; $n_D^{25}$, 1.4657.

Hydrochloride, melting point 116–120 degrees centigrade after crystallization from ethyl acetate.

21. 1-(2,5-dimethyl-1-pyrrolidyl)propyl-2 α-phenyl-α-(delta-2-cyclopentenyl)acetate $(C_5H_7-CH(C_6H_5)-COO-CH(CH_3)-CH_2-N-CH(CH_3)-CH_2-CH_2-CH)CH_3))$ boiling point 124 degrees centigrade at a pressure of 0.015 millimeter of mercury; $n_D^{25}$, 1.5097.

Hydrochloride, melting point 143–146 degrees centigrade after crystallization from ethyl acetate.

22. 1 - (2,5 - dimethyl - 1 - pyrrolidyl)propyl-2 α-phenyl-α-(delta-2-cyclohexenyl)acetate $(C_6H_9-CH(C_6H_5)-COO-CH(CH_3)-CH_2-N-CH(CH_3)-CH_2-CH_2-CH(CH_3))$ boiling point 154 degrees centigrade at a pressure of 0.05 millimeter of mercury; $n_D^{25}$, 1.5147.

23. 1-(2,5-dimethyl-1-pyrrolidyl)propyl-2 α-cyclopentyl-α-propylacetate $(C_5H_9-CH(C_3H_7)-COO-CH(CH_3)-CH_2-N-CH(CH_3)-CH_2-CH_2-CH(CH_3))$ boiling point 117 degrees centigrade at a pressure of 0.03 millimeter of mercury; $n_D^{25}$, 1.4636.

24. 2 - (2,3 - dimethyl - 1 - pyrrolidyl)ethyl α-phenyl-α-(delta-2-cyclopentenyl)acetate $(C_5H_7-CH(C_6H_5)-COO-CH_2-CH_2-N-CH(CH_3)-CH(CH_3)-CH_2-CH_2)$ boiling point 138 degrees centigrade at a pressure of 0.03 millimeter of mercury; $n_D^{25}$, 1.5170.
Hydrochloride, melting point 105–107.5 degrees centigrade after crystallization from an ethyl acetate-ether mixture.

25. 2 - (2,3 - dimethyl - 1 - pyrroldiyl)ethyl α-phenyl-α-(delta-2-cyclohexenyl)acetate $(C_6H_9-CH(C_6H_5)-COO-CH_2-CH_2-N-CH(CH_3)-CH(CH_3)-CH_2-CH_2)$ boiling point 151 degrees centigrade at a pressure of 0.04 millimeter of mercury; $n_D^{25}$, 1.5219.
Hydrochloride, melting point 145–156 degrees centigrade after crystallization from methyl ethyl ketone.

26. 2 - (2,3 - dimethyl - 1 - pyrrolidyl)ethyl α-cyclopentyl-α-propylacetate $(C_5H_9-CH(C_3H_7)-COO-CH_2-CH_2-N-CH(CH_3)-CH(CH_3)-CH_2-CH_2)$ boiling point 109 degrees centigrade at a pressure of 0.03 millimeter of mercury; $n_D^{25}$, 1.4670.
Hydrochloride, melting point 101–104 degrees centigrade after crystallization from an ethyl acetate-ether mixture.

27. 2 - (2,4 - dimethyl - 1 - pyrrolidyl)ethyl α-phenyl-α-(delta-2-cyclopentenyl)acetate $(C_5H_7-CH(C_6H_5)-COO-CH_2-CH_2-N-CH(CH_3)-CH_2-CH(CH_3)-CH_2)$ boiling point 132 degrees centigrade at a pressure of 0.02 millimeter of mercury; $n_D^{25}$, 1.5147.
Hydrochloride, melting point 150–152 degrees centigrade after crystallization from methyl ethyl ketone.

28. 1 - (2,4 - dimethyl - 1 - pyrrolidyl)propyl-2 α-phenyl-α-(delta-2-cyclopentenyl)acetate $(C_5H_7-CH(C_6H_5)-COO-CH(CH_3)-CH_2-N-CH(CH_3)-CH_2-CH(CH_3)-CH_2)$ boiling point 121 degrees centigrade at a pressure of 0.015 millimeter of mercury; $n_D^{25}$, 1.5078.
Hydrochloride, melting point 136–140 degrees centigrade after crystallization from a mixture of ether and ethyl acetate.

29. 2 - (3,4 - dimethyl - 1 - pyrrolidyl)ethyl α-phenyl-α-(delta-2-cyclopentenyl)acetate $(C_5H_7-CH(C_6H_5)-COO-CH_2-CH_2-N-CH_2-CH(CH_3)-CH(CH_3)-CH_2)$ boiling point 126 degrees centigrade at a pressure of 0.015 millimeter of mercury; $n_D^{25}$, 1.5133.

30. 2 - (3,4 - dimethyl - 1 - pyrrolidyl)ethyl α-phenyl-α-cyclopentylacetate $(C_5H_9-CH(C_6H_5)-COO-CH_2-CH_2-N-CH_2-CH(CH_3)-CH(CH_3)-CH_2)$ boiling point 125 degrees centigrade at a pressure of 0.01 millimeter of mercury; $n_D^{25}$, 1.5065.

31. 2 - (3,4 - dimethyl - 1 - pyrrolidyl) ethyl α-phenyl-α-(delta-2-cyclohexenyl) acetate (C₆H₉—CH(C₆H₅)—COO—CH₂—CH₂—N—CH₂—CH(CH₃)—CH(CH₃)—CH₂)

boiling point 142 degrees centigrade at a pressure of 0.02 millimeter of mercury; $n_D^{25}$, 1.5180. Hydrochloride, melting point 122.5–124 degrees centigrade after crystallization from ethyl acetate.

32. 2 - (2 - methyl - 2-ethyl-1-pyrrolidyl) ethyl α-cyclopentyl-α-n-propylacetate (C₅H₉—CH(C₃H₇)—COO—CH₂—CH₂—N—C(CH₃)(C₂H₅)—CH₂—CH₂—CH₂)

boiling point 110 degrees centigrade at 0.06 millimeter of mercury absolute; $n_D^{25}$, 1.4675. Hydrochloride, melting point 148–150 degrees centigrade; analysis: calculated 10.20% Cl; found 10.17%, 10.23% Cl.

33. 2 - (methyl - 2-ethyl - 1 - pyrrolidyl) ethyl α-(delta-2-cyclopentenyl)-α-phenylacetate (C₃H₇—CH(C₆H₅)—COO—CH₂—CH₂—N—C(CH₃)(C₂H₅)—CH₂—CH₂—CH₂)

boiling point 143–144 degrees centigrade at 0.03 millimeter of mercury absolute; $n_D^{25}$, 1.5069. Hydrochloride, melting point 165–167 degrees centigrade; analysis: calculated 9.35% Cl; found 9.40%, 9.37% Cl.

34. 2 - (2,2,3 - trimethyl-1-pyrrolidyl) ethyl α-cyclopentyl-α-n-propylacetate (C₅H₉—CH(C₃H₇)—COO—CH₂—CH₂—N—C(CH₃)₂—CH(CH₃)—CH₂—CH₂)

boiling point 104–105 degrees centigrade at 0.06 millimeter of mercury; $n_D^{25}$ 1.4690. Hydrochloride, melting point 153–154 degrees centigrade; analysis: calculated 10.34% Cl; found 10.25%, 10.04% Cl.

35. 2 - (2,2,3 - trimethyl - 1 - pyrrolidyl) ethyl α-(delta-2-cyclopentenyl)-α-phenylacetate (C₃H₇—CH(C₆H₅)—COO—CH₂—CH₂—N—C(CH₃)₂—CH(CH₃)—CH₂—CH₂)

boiling point 142–143 degrees centigrade at 0.05 millimeter of mercury absolute; $n_D^{25}$ 1.5160. Hydrochloride, melting point 120–132 degrees centigrade; analysis: calculated 9.35% Cl, found 9.29%, 9.41% Cl.

36. 2 - (2,2 - dimethyl - 1 - pyrrolidyl) propyl α-cyclopentyl-α-n-propylacetate (C₅H₉—CH(C₃H₇)—COO—CH₂—CH(CH₃)—N—C(CH₃)₂—CH₂—CH₂—CH₂)

boiling point 117.5–119 degrees centigrade at 0.07 millimeter of mercury, $n_D^{25}$ 1.4688. Hydrochloride, melting point 108.5–110 degrees centigrade; analysis: calculated 10.25% Cl; found 10.18%, 10.24% Cl.

37. 2 - (2,2 - dimethyl - 1 - pyrrolidyl) ethyl α-cyclopentyl-α-n-propylacetate (C₅H₉—CH(C₃H₇)—COO—CH₂—N—C(CH₃)₂—CH₂—CH₂—CH₂)

the boiling point of the ester is 100 degrees centigrade at a pressure of 0.03 millimeter and its refractive index $(n_D^{25})$ 1.4679.

The melting point of the hydrochloride is 119.5–121 degrees centigrade.

The methochloride has a melting point of 180.5–181.5 degrees centigrade; analysis: calculated 10.28% Cl; found 10.00% Cl.

The methobromide has a melting point of 206–209 degrees centigrade.

The melting point of the ethobromide is 149.5–150 degrees centigrade.

38. 2 - (1 - pyrrolidyl) ethyl α - phenyl - α - cyclohexylacetate (C₆H₁₁—CH(C₆H₅)—COO—CH₂—CH₂—N—CH₂—CH₂—CH₂—CH₂)

boiling point 125 degrees centigrade at 0.06 millimeter; $n_D^{25}$ 1.5204; analysis: calculated 4.44% N; found 4.46% N. Hydrochloride, melting point 129–130 degrees centigrade; analysis: calculated 10.08% Cl; found 9.95% Cl.

39. 3 - (1 - pyrrolidyl) propyl α - phenyl - α - cyclohexylacetate (C₆H₁₁—CH(C₆H₅)—COO—CH₂—CH₂—CH₂—N—CH₂—CH₂—CH₂—CH₂)

boiling point 145 degrees centigrade at 0.06 millimeter; $n_D^{25}$ 1.5177; analysis: calculated 4.25% N; found 4.16% N. Hydrochloride, melting point 123–124.5 degrees centigrade; analysis: calculated 9.69% Cl; found 9.60% Cl.

40. 2 - (1 - pyrrolidyl) ethyl α - phenyl - α-(delta-2-cyclohexenyl) acetate (C₆H₉—CH(C₆H₅)—COO—CH₂—CH₂—N—CH₂—CH₂—CH₂—CH₂)

boiling point 137 degrees centigrade at 0.07 millimeter; $n_D^{25}$ 1.5295; analysis: calculated 4.47% N; found 4.61% N. Hydrochloride, melting point 132–134 degrees centigrade; analysis: calculated 10.13% Cl; found 10.08% Cl.

Methobromide, melting point 127–129 degrees centigrade.

Ethobromide, melting point 136–138 degrees centigrade.

41. 3-(1-pyrrolidyl) propyl α-phenyl-α-(delta-2-cyclohexenyl)-acetate (C₆H₉—CH(C₆H₅)—COO—CH₂—CH₂—CH₂—N—CH₂—CH₂—CH₂—CH₂)

boiling point 139 degrees centigrade at 0.07 millimeter; $n_D^{25}$ 1.5260; analysis: calculated 4.28% N; found 4.41% N. Hydrochloride, melting point 129–133 degrees centigrade; analysis: calculated 9.74% Cl; found 9.83% Cl.

42. 2-(1-pyrrolidyl)-1-methylethyl α-phenyl-α-(delta-2-cyclohexenyl)acetate

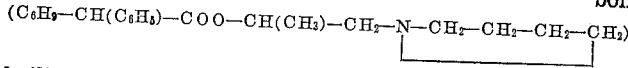

boiling point 120 degrees centigrade at 0.03 millimeter; $n_D^{25}$ 1.5219; analysis: calculated 4.28% N; found 4.33% N. Hydrochloride, melting point 177–186 degrees centigrade; analysis: calculated 9.74% Cl; found 9.48% Cl.

43. 3-(1-pyrrolidyl)propyl α,α-diphenylacetate

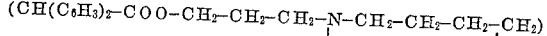

boiling point 148 degrees centigrade at 0.01 millimeter; $n_D^{25}$ 1.5492; analysis: calculated 4.33% N; found 4.36% N. Hydrochloride, melting point 142.5–143.5 degrees centigrade; analysis: calculated 9.85% Cl; found 9.75% Cl.

44. 2-(1-pyrrolidyl)-1-methlyethyl α,α-diphenylacetate

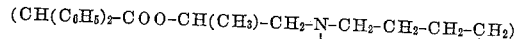

boiling point 119 degrees centigrade at 0.01 millimeter; $n_D^{25}$ 1.5455; analysis: calculated 4.33% N; found 4.45% N. Hydrochloride, melting point 166–167 degrees centigrade; analysis: calculated 9.85% Cl; found 9.72% Cl.

45. 2-(1-pyrrolidyl)propyl α,α-diphenylacetate

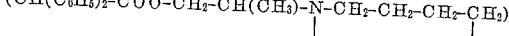

boiling point 146 degrees centigrade at 0.01 millimeter; $n_D^{25}$ 1.5493; analysis: calculated 4.33% N; found 4.26% N. Hydrochloride, melting point 117.5–120 degrees centigrade; analysis: calculated 9.85% Cl; found 9.81% Cl.

46. 2-(1-pyrrolidyl)ethyl α-n-propyl-α-(delta-2-cyclopentenylacetate

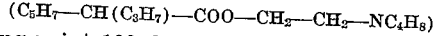

boiling point 100 degrees centigrade at 0.03 millimeter; $n_D^{25}$ 1.4761; analysis: calculated 5.28% N; found 5.40% N. Hydrochloride, melting point 67–71 degrees centigrade; analysis: calculated 11.74% Cl; found 11.65% Cl.

47. 3-(1-pyrrolidyl)propyl α-n-propyl-α-(delta-2-cyclopentenyl)acetate

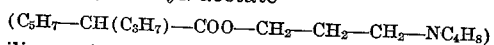

boiling point 120 degrees centigrade at 0.05 millimeter; $n_D^{25}$ 1.4758; analysis: calculated 5.01% N; found 5.10% N. Hydrochloride, melting point 83–85 degrees centigrade; analysis: calculated 11.23% Cl; found 11.02% Cl.

48. 2-(1-pyrrolidyl)-1-methylethyl α-n-propyl-α-(delta-2-cyclopentenyl)acetate

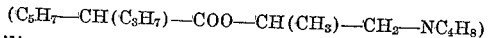

boiling point 105 degrees centigrade at 0.025 millimeter; $n_D^{25}$ 1.4719; analysis: calculated 5.01% N; found 4.87% N. Hydrochloride, melting point 97–99 degrees centigrade; analysis: calculated 11.23% Cl; found 11.16% Cl.

49. 3-(1-pyrrolidyl)propyl α-phenyl-α-cyclopentylacetate

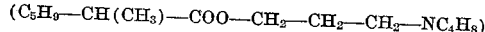

boiling point 125 degrees centigrade at 0.03 millimeter; $n_D^{25}$ 1.5146; analysis: calculated 4.44% N; found 4.45% N. Hydrochloride, melting point 130–131.5 degrees centigrade; analysis: calculated 10.13% Cl; found 10.04% Cl.

50. 2-(1-pyrrolidyl)-1-methylethyl α-phenyl-α-cyclopentylacetate

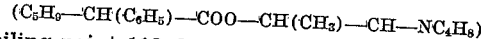

boiling point 112 degrees centigrade at 0.03 millimeter; $n_D^{25}$ 1.5103; analysis: calculated 4.44% N; found 4.42% N. Hydrochloride, melting point 120–125 degrees centigrade; analysis: calculated 10.11% Cl; found 10.02% Cl.

51. 3-(1-pyrrolidyl)propyl α-phenyl-α-(delta-2-cyclopentenyl)acetate

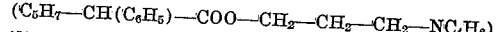

boiling point 129 degrees centigrade at 0.04 millimeter; $n_D^{25}$ 1.5220; analysis: calculated 4.47% N; found 4.61% N. Hydrochloride, melting point 117–120 degrees centigrade; analysis: calculated 10.13% Cl; found 10.04 Cl.

52. 2-(1-pyrrolidyl)-1-methylethyl α-phenyl-α-(delta-2-cyclopentenyl)acetate

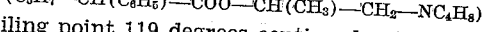

boiling point 119 degrees centigrade at 0.05 millimeter; $n_D^{25}$ 1.5175; analysis: calculated 4.47% N; found 4.61% N. Hydrochloride, melting point 184–187 degrees centigrade; analysis: calculated 10.13% Cl; found 10.04% Cl.

53. 2-(1-pyrrolidyl)ethyl α-(delta-2-cyclopentenyl)-α-(delta-2-cyclohexenyl)acetate

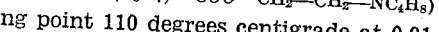

boiling point 110 degrees centigrade at 0.01 millimeter; $n_D^{25}$ 1.5064; analysis; calculated 4.62% N; found 4.77% N. Hydrochloride, melting point 105.5–106.5 degrees centigrade; analysis: calculated 10.43% Cl; found 10.45% Cl.

54. 3-(1-pyrrolidyl)propyl α-(delta-2-cyclopentenyl)-α-(delta-2-cyclohexenyl)acetate

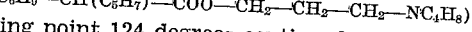

boiling point 124 degrees centigrade at 0.01 millimeter; $n_D^{25}$ 1.5043; analysis: calculated 4.41% N; found 4.36% N. Citrate, melting point 120.5–122 degrees centigrade.

55. 2-(1-pyrrolidyl)-1-methylethyl α-(delta-2-cyclopentenyl)-α-(delta-2-cyclohexenyl)acetate

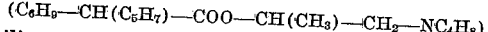

boiling point 125 degrees centigrade at 0.03 millimeter; $n_D^{25}$ 1.5008; analysis: calculated 4.41% N; found 4.47% N. Hydrochloride, melting point 147–158 degrees centigrade (dec); analysis: calculated 10.02% Cl; found 10.07% Cl.

56. 2-(1-pyrrolidyl)-n-propyl α-(delta-2-cyclopentenyl)-α-(delta-2-cyclohexenyl)acetate

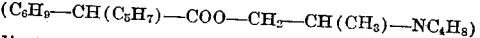

boiling point 114 degrees centigrade at 0.01 millimeter; $n_D^{25}$ 1.5065; analysis: calculated 4.41% N; found 4.46% N. Citrate, melting point 127–129 degrees centigrade.

57. 2-(1-pyrrolidyl)ethyl α-n-propyl-α-cyclopentylacetate

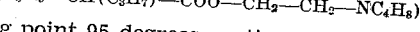

boiling point 95 degrees centigrade at 0.01 millimeter; $n_D^{25}$ 1.4686. Hydrochloride, melting point 102–104 degrees centigrade.

58. 3-(1-pyrrolidyl)propyl α-n-propyl-α-cyclopentylacetate

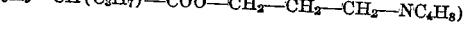

boiling point 101 degrees centigrade at 0.01 millimeter $n_D^{25}$ 1.4690. Hydrochloride, melting point 115.5–116.5 degrees centigrade; analysis: calculated 11.55% Cl; found 11.30% Cl.

59. 2-(1-pyrrolidyl)-1-methylethyl α-n-propyl-α-cyclopentylacetate

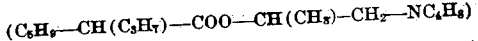

boiling point 87 degrees centigrade at 0.008 millimeter; $n_D^{25}$ 1.4648. Hydrochloride, melting point 107–109 degrees centigrade.

60. 2-(1-pyrrolidyl)ethyl α-n-butyl-α-cyclopentylacetate

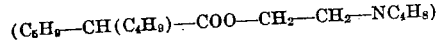

boiling point 104 degrees centigrade at 0.01 millimeter; $n_D^{25}$ 1.4683. Hydrochloride, melting point 88–90 degrees centigrade; analysis: calculated 11.15% Cl; found 11.17% Cl.

61. 3-(1-pyrrolidyl)propyl α-n-butyl-α-cyclopentylacetate

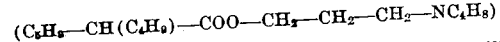

boiling point 104 degrees centigrade at 0.009 millimeter; $n_D^{25}$ 1.4688. Hydrochloride, melting point 98.5–102 degrees centigrade; analysis: calculated 10.68% Cl; found 10.77% Cl.

62. 2-(1-pyrrolidyl)-1-methylethyl α-n-butyl-α-cyclopentylacetate

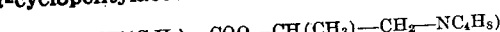

boiling point 100 degrees centigrade at 0.01 millimeter; $n_D^{25}$ 1.4649. Hydrochloride, melting point 103–108 degrees centigrade; analysis: calculated 10.68% Cl; found 10.57% Cl.

63. 2-(1-pyrrolidyl)propyl α-n-butyl-α-cyclopentylacetate

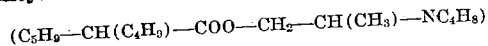

boiling point 110 degrees centigrade at 0.03 millimeter; $n_D^{25}$ 1.4700. Hydrochloride, melting point 77–81 degrees centigrade; analysis: calculated 10.68% Cl; found 10.56% Cl.

64. 2-(1-pyrrolidyl)ethyl α-n-butyl-α-(delta-2-cyclopentenyl)acetate

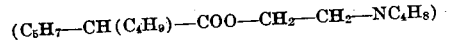

boiling point 100 degrees centigrade at 0.02 millimeter; $n_D^{25}$ 1.4752. Citrate, melting point 88–89 degrees centigrade.

65. 3-(1-pyrrolidyl)propyl α-n-butyl-α-(delta-2-cyclopentenyl)acetate

boiling point, 99 degrees centigrade at 0.005 millimeter; $n_D^{25}$ 1.4750. Hydrochloride, melting point 76–78 degrees centigrade. Citrate, melting point 117–118 degrees centigrade.

In the preparations which follow are disclosed 1-pyrrolidyl alkanols which are used in the preparation of additional examples of the esters of the invention which follow thereafter.

PREPARATION 18.—5,5-DIMETHYLPYRROLIDONE-2

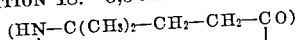

A solution of 148 grams (approximately 0.845 mole) of methyl alpha-methyl-alpha-nitrovalerate ($C_2H_5$—$CH_2$—$C(CH_3)(NO_2)$ — $COO$ — $CH_3$), prepared as described in Bruson U. S. Patent 2,390,918, in approximately 500 milliliters of absolute ethanol was hydrogenated in the presence of approximately 25 grams of Raney nickel catalyst at a temperature of 60 degrees centigrade and a pressure of approximately 1000 pounds per square inch gauge. The catalyst was separated by filtration, the solvent removed by distillation and the residue was heated to approximately 200 degrees centigrade and distilled at subatmospheric pressure. Its boiling point was 75 degrees centigrade at a pressure of 0.05 millimeter and it solidified in the receiver. The yield was 82.5 grams or 86.2 percent of the theoretical. A sample recrystallized from pentane had a melting point of 37–41 degrees centigrade.

Analysis.—Calculated for $C_6H_{11}NO$: 12.38% N. Found: 11.94% N.

Another method for the preparation of 5,5-dimethylpyrrolidone-2 is described by Buckley and Elliott in J. Chem. Soc. (London) 1947, 1508.

PREPARATION 19.—2,2-DIMETHYLPYRROLIDINE

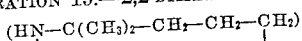

A solution of 90.5 grams (approximately 0.8 mole of 5,5-dimethylpyrrolidone-2 (Preparation 18) in 200 milliliters of tetrahydrofuran was added slowly with stirring to a mixture of 38.0 grams (1 mole) of lithium aluminum hydride and 400 milliliters of tetrahydrofuran. The mixture was refluxed for 8 hours and thereafter most of the tetrahydrofuran was removed by distillation on a steam bath and was replaced by the careful addition of 300 milliliters of ether. Then 30 milliliters of water, followed by a solution of 200 milliliters of concentrated hydrochloric acid in 300 milliliters of water, was added to the mixture. The aqueous solution was extracted continuously with absolute ether for 5 hours, then made very strongly basic with sodium hydroxide and again continuously extracted with absolute ether for 12 hours. The ether extracts were dried over potassium carbonate and distilled through an efficient fractionating column to yield 62.5 grams (79 percent of the theoretical) of a colorless liquid having a boiling point of 103 degrees centigrade, $n_D^{25}$ 1.4304 and $d_4^{25}$ 0.82114.

Analysis.—Calculated for $C_6H_{13}N$: 14.13% N; neutral equivalent 99.17. Found 14.12% N; neutral equivalent 99.6.

Another method for the preparation of this compound was described by Buckley and Elliott, J. Chem. Soc., 1947, 1508.

PREPARATION 20.—2-(2,2-DIMETHYL-1-PYRROLIDYL) ETHANOL

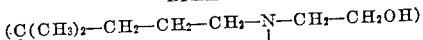

Into a 500 milliliter flask, fitted with condenser, stirrer and thermometer, was placed 59.9 grams (0.6 mole) of 2,2-dimethylpyrrolidine (Preparation 19) and then 48.4 grams (0.6 mole) of ethylene chlorohydrin was added. The mixture was heated to approximately 120 degrees centigrade to start the reaction and, after the initial reaction had subsided, it was heated to approximately 150 to 160 degrees centigrade for 5 minutes. The mixture was cooled and 60 milliliters of 50 percent aqueous sodium hydroxide solution was added thereto and the product was taken up in ether. The ether solution was dried over potassium carbonate and the ether was removed and the residue distilled through a short column. The yield was 62.2 grams (72.4% of the theoretical) and the product was a colorless liquid having a boiling point of 90 degrees centigrade at a pressure of 18 millimeters, $n_D^{25}$ 1.4660, $d_4^{25}$ 0.9454.

*Analysis.*—Calculated for $C_8H_{17}NO$: 9.78% N; neutral equivalent 143.23. Found: 9.81% N; neutral equivalent 143.1.

PREPARATION 21.—3,5,5-TRIMETHYLPYRROLIDONE-2

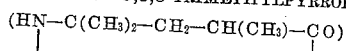

3,5,5-trimethylpyrrolidone-2 was prepared from methyl alpha,gamma-dimethyl-gamma-nitrovalerate

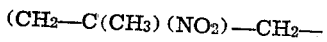
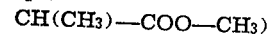

whose preparation was described by Leonard and Shoemaker, J. Am. Chem. Soc., 71, 1760 (1949) in a manner similar to that of Preparation 18 for 5,5-dimethylpyrrolidone-2. The product had a boiling point of 1220 degrees centigrade at a pressure of 11 millimeters and was obtained in a yield of 94 percent of the theoretical. A sample recrystallized from Skellysolve B, melted at 80–82 degrees centigrade.

*Analysis.*—Calculated for $C_7H_{13}NO$: 11.01% N. Found: 11.09% N.

PREPARATION 22.—2,2,4-TRIMETHYLPYRROLIDINE

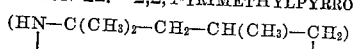

2,2,4-trimethylpyrrolidine was prepared from 3,5,5-trimethylpyrrolidone-2 (Preparation 21) in 85% of the theoretical yield in a manner similar to that described for the preparation of 2,2-dimethylpyrrolidine in Preparation 19. Its boiling point was 119 degrees centigrade at atmospheric pressure and its refractive index ($n_D^{25}$) 1.4259 and its density ($d_4^{25}$) 0.8063.

*Analysis.*—Calculated for $C_7H_{15}N$: 12.38% N. Found: 12.36% N.

PREPARATION 23.—2-(2,2,4-TRIMETHYL-1-PYRROLIDYL)ETHANOL

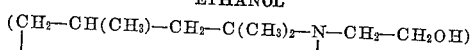

2-(2,2,4-trimethyl-1-pyrrolidyl)ethanol was prepared by the method described for the preparation of 2-(2,2-dimethyl-1-pyrrolidyl)ethanol in Preparation 20 from 2,2,4-trimethyl-pyrrolidine (Preparation 22) in 65.6% yield. The compound has a boiling point of 87 degrees centigrade at a pressure of 12 milliliters, $n_D^{25}$ 1.4581, and $d_4^{25}$ 0.9154.

*Analysis.*—Calculated for $C_9H_{19}NO$: 8.91% N. Found: 9.02% N.

PREPARATION 24.—5-NITRO-5-METHYLHEXANONE-2

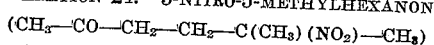

One hundred milliliters (1.28 mole) of methyl vinyl ketone was slowly added with stirring over the course of one hour to a solution of 111 milliliters (1.28 mole) of 2-nitropropane and 5 milliliters of a 40 percent aqueous solution of trimethylbenzylammonium hydroxide (Triton B) in 100 milliliters of absolute ethanol. The temperature spontaneously rose to 64 degrees. The mixture was refluxed with stirring for one hour and then diluted with ether, washed with dilute hydrochloric acid, then with dilute aqueous sodium bicarbonate solution and finally with saturated sodium chloride solution and dried over anhydrous sodium sulfate. The solvent was removed and the product was distilled through a short column, yielding 108.9 grams (53.4 percent of the theoretical) of a light-yellow liquid having a boiling point of 119 degrees centigrade at 11 millimeters, $n_D^{25}$ 1.4447 and $d_4^{25}$ 1.05644.

PREPARATION 25.—2,2,5-TRIMETHYLPYRROLIDINE

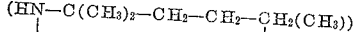

A solution of 32 grams (0.2 mole) of 5-nitro-5-methylhexanone-2 (Preparation 24) was hydrogenated in the presence of a Raney nickel catalyst at a temperature of 60 degrees centigrade and a pressure of 1000 pounds per square inch gauge. The catalyst was removed by filtration and the filtrate was distilled through a short column. The yield of 2,2,5-trimethylpyrrolidine was 11.2 grams (49.6 percent) and its boiling point was 112 degrees centigrade at atmospheric pressure, $n_D^{25}$ 1.4223, $d_4^{25}$ 0.7980.

*Analysis.*—Calculated for $C_7H_{15}N$: 12.38% N. Found: 12.38% N.

PREPARATION 26.—2-(2,2,5-TRIMETHYL-1-PYRROLIDYL)ETHANOL

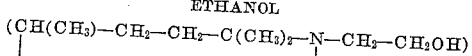

2,2,5-trimethylpyrrolidine (Preparation 25) was reacted with ethylene chlorohydrin in the manner described for the preparation of 2-(2,2-dimethyl-1-pyrrolidyl)ethanol in Preparation 20 hereinbefore, allowing the reaction to proceed slowly and refluxing for 2½ hours. The yield was 14.6 percent of the theoretical and physical constants of the product were as follows: boiling point, 86 degrees centigrade at a pressure of 11.5 millimeters; $n_D^{25}$ 1.4602; $d_4^{25}$ 0.92063.

*Analysis.*—Calculated for $C_9H_{19}NO$: 8.91% N. Found: 8.89% N.

PREPARATION 27.—2-(2,4-DIMETHYL-3-ETHYL-1-PYRROLIDYL)ETHANOL

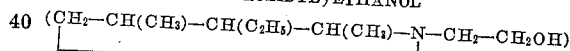

2,4-dimethyl-3-ethylpyrrolidine, prepared as described by Fischer and Hoefelmann, Z. Physiol. Chem. 251, 187 (1938), was reacted with ethylene chlorohydrin in the manner described for the preparation of 2-(2,2-dimethyl-1-pyrrolidyl)-ethanol in Preparation 20 hereinbefore. The yield was 34 percent of the theoretical, and the boiling point of the compound was 104–106 degrees centigrade at a pressure of 16 millimeters.

PREPARATION 28.—2-(2-ETHYL-1-PYRROLIDYL)ETHANOL

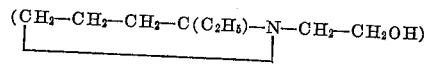

2-(2-ethyl-1-pyrrolidyl)ethanol may be made by the method described by Normant, Compt. rend. 226, 1734 (1948).

66. 2-(1-pyrrolidyl)ethyl α-phenyl-α-isobutylacetate

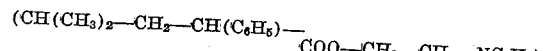

boiling point, 130 degrees centigrade at a pressure of 0.15 millimeter; $n_D^{25}$ 1.5001. Hydrochloride salt has a melting point of 99.5–100.5 degrees centigrade.

67. 2-(1-pyrrolidyl)propyl α-phenyl-α-(delta-2-cyclopentenyl)-acetate

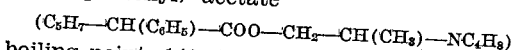

boiling point, 148 degrees centigrade at a pressure of 0.15 millimeter; $n_D^{25}$ 1.5230. The hydrochloride salt has a melting point of 123–127 degrees centigrade.

68. 2-(1-pyrrolidyl)propyl α-phenyl-α-(delta-2-cyclohexenyl)-acetate

boiling point, 147 degrees centigrade at a pressure of 0.03 millimeter; $n_D^{25}$ 1.5278. The hydrochloride has a melting point of 116–120 degrees centigrade.

69. 2-(1-pyrrolidyl)propyl α-phenyl-α-cyclopentylacetate $(C_5H_9$—$CH(C_6H_5)$—$COO$—$CH_2$—$CH(CH_3)$—$NC_4H_8)$ boiling point, 113 degrees at a pressure of 0.012 millimeter; $n_D^{25}$ 1.5157. The hydrochloride has a melting point of 105–111 degrees centigrade.

70. 2-(1-pyrrolidyl)propyl α-propyl-α-cyclopentylacetate

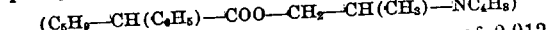

boiling point, 90 degrees centigrade at a pressure of 0.012 millimeter; $n_D^{25}$ 1.4708. Its citrate salt has a melting point of 131–132 degrees centigrade.

71. 2-(1-pyrrolidyl)-2,2-dimethylethyl α-phenyl-α-(delta-2-cyclopentenyl)acetate $(C_5H_7$—$CH(C_6H_5)$—$COO$—$CH_2$—$C(CH_3)_2$—$NC_4H_8)$ boiling point, 128 degrees centigrade at a pressure of 0.015 millimeter; $n_D^{25}$ 1.5220. Its citrate salt has a melting point of 103–107 degrees centigrade.

72. 2-(1-pyrrolidyl)-2,2-dimethylethyl α-phenyl-α-(delta-2-cyclohexenyl)acetate $(C_6H_9$—$CH(C_6H_5)$—$COO$—$CH_2$—$C(CH_3)_2$—$NC_4H_8)$ boiling point, 147 degrees centigrade at a pressure of 0.028 millimeter; $n_D^{25}$ 1.5259. Its citrate salt has a melting point of 112–114 degrees centigrade.

73. 2-(1-pyrrolidyl)-2,2-dimethylethyl α-(delta-2-cyclohexenyl)-α-(delta-2-cyclopentenyl)-acetate $(C_5H_7$—$CH(C_6H_7)$—$COO$—$CH_2$—$C(CH_3)_2$—$NC_4H_8)$ boiling point, 124 degrees centigrade at a pressure of 0.008 millimeter; $n_D^{25}$ 1.5070. The hydrochloride salt has a melting point of 117–119 degrees centigrade.

74. 2-(1-pyrrolidyl)-2,2-dimethylethyl α-propyl-α-cyclopentylacetate

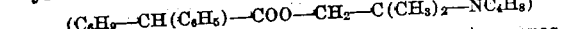

boiling point, 107 degrees centigrade at a pressure of 0.05 millimeter; $n_D^{25}$ 1.4775. Its citrate salt has a melting point of 103–103.5 degrees centigrade.

75. 2-(1-pyrrolidyl)-1,2-dimethylethyl α-phenyl-α-(delta-2-cyclopentenyl)acetate $(C_5H_7$—$CH(C_6H_5)$—$COO$—$CH(CH_3)$—$CH(CH_3)$—$NC_4H_8)$ boiling point, 120 degrees centigrade at a pressure of 0.01 millimeter; $n_D^{25}$ 1.5183. The citrate salt has a melting point of 80–106 degrees centigrade.

76. 2-(1-pyrrolidyl)-1,2-dimethylethyl α-phenyl-α-(delta-2-cyclohexenyl)acetate $(C_6H_9$—$CH(C_6H_5)$—$COO$—$CH(CH_3)$—$CH(CH_3)$—$NC_4H_8)$ boiling point, 132 degrees centigrade at a pressure of 0.012 millimeter; $n_D^{25}$ 1.5230. Its citrate salt has a melting point of 90–102 degrees centigrade.

77. 2-(1-pyrrolidyl)-1,2-dimethylethyl α-(delta-2-cyclohexenyl)-α-(delta-2-cyclopentenyl)-acetate $(C_6H_9$—$CH(C_5H_7)$—$COO$—$CH(CH_3)$—$CH(CH_3)$—$NC_4H_8)$ boiling point, 144 degrees centigrade at a pressure of 0.04 millimeter; $n_D^{25}$ 1.5030. Its citrate salt has a melting point of 97–103 degrees centigrade.

78. 2-(1-pyrrolidyl)-1,2-dimethylethyl α-propyl-α-cyclopentylacetate

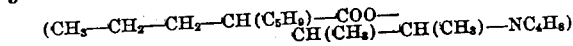

boiling point, 90 degrees centigrade at a pressure of 0.03 millimeter; $n_D^{25}$ 1.4696. Its hydrochloride has a melting point of 106.5–111 degrees centigrade.

79. 3-(1-pyrrolidyl)-2-methylpropyl α-phenyl-α-(delta-2-cyclohexenyl)acetate

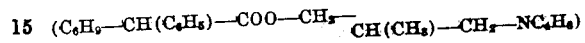

boiling point, 128 degrees centigrade at a pressure of 0.01 millimeter; $n_D^{25}$ 1.5223. Its hydrochloride has a melting point of 119–123 degrees centigrade.

80. 3-(1-pyrrolidyl)-2-methylpropyl α-propyl-α-cyclopentylacetate

boiling point, 100 degrees centigrade at a pressure of 0.013 millimeter; $n_D^{25}$ 1.4681. Its hydrochloride has a melting point of 88–89 degrees centigrade.

81. 3-(1-pyrrolidyl)-3-methylpropyl α-phenyl-α-(delta-2-cyclopentenyl)acetate

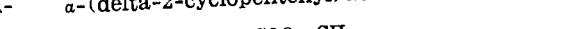

boiling point, 146 degrees centigrade at a pressure of 0.024 millimeter; $n_D^{25}$ 1.5213. Its hydrochloride has a melting point of 133–136 degrees centigrade.

82. 3-(1-pyrrolidyl)-3-methylpropyl α-propyl-α-cyclopentenylacetate

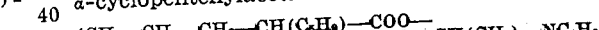

boiling point, 115 degrees centigrade at a pressure of 0.027 millimeter; $n_D^{25}$ 1.4717. Its hydrochloride has a melting point of 78–80 degrees centigrade.

83. 3-(1-pyrrolidyl)-1-methylpropyl α-phenyl-α-(delta-2-cyclohexenyl)acetate

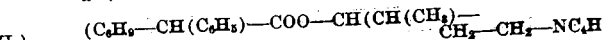

boiling point, 140 degrees centigrade at a pressure of 0.016 millimeter; $n_D^{25}$ 1.5205. Its hydrochloride has a melting point of 153–154.5 degrees centigrade.

84. 3-(1-pyrrolidyl)-1-methylpropyl α-propyl-α-cyclopentylacetate

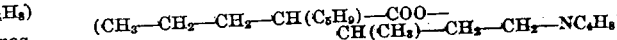

boiling point, 135 degrees centigrade at a pressure of 0.22 millimeter; $n_D^{25}$ 1.4671. Its hydrochloride has a melting point of 125–127 degrees centigrade.

85. 4-(1-pyrrolidyl)butyl α-phenyl-α-(delta-2-cyclopentenyl)-acetate $(C_5H_7$—$CH(C_6H_5)$—$COO$—$CH_2$—$CH_2$—$CH_2$—$NC_4H_8)$ boiling point, 138 degrees centigrade at a pressure of 0.017 millimeter; $n_D^{25}$ 1.5192. Its hydrochloride has a melting point of 101–103 degrees centigrade.

86. 4-(1-pyrrolidyl)butyl α-phenyl-α-(delta-2-cyclohexenyl)-acetate

boiling point, 162 degrees centigrade at a pressure of 0.038 millimeter; $n_D^{25}$ 1.5241. Its hydrochloride has a melting point of 97–99 degrees centigrade.

87. 4 - (1 - pyrrolidyl)butyl α - propyl - α-cyclopentylacetate

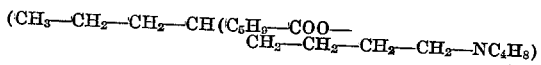

boiling point, 130 degrees centigrade at a pressure of 0.07 millimeter; $n_D^{25}$ 1.4698. Its citrate has a melting point of 93.5–94.5 degrees centigrade.

88. 3-(1-pyrrolidyl)-2,2-dimethylpropyl α-propyl-α-cyclopentylacetate

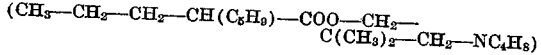

boiling point, 131 degrees centigrade at a pressure of 0.11 millimeter; $n_D^{25}$ 1.4677. Its hydrochloride has a melting point of 134–135.5 degrees centigrade.

89. 3 - (1 - pyrrolidyl) - 2,2 - dimethylpropyl α-phenyl-α-(delta-2-cyclohexenyl) acetate

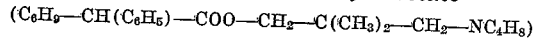

boiling point, 130 degrees centigrade at a pressure of 0.007 millimeter; $n_D^{25}$ 1.5187.

90. 2 - (3,4 - dimethyl - 1 - pyrrolidyl) ethyl α-n-butyl-α-(delta-2-cyclopentenyl) acetate

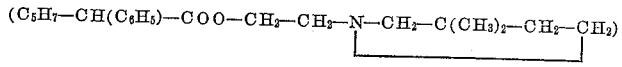

boiling point, 124 degrees centigrade at a pressure of 0.04 millimeter; $n_D^{25}$ 1.4696. Its hydrochloride has a melting point of 136–137.5 degrees centigrade.

91. 2-(3,4-dimethyl-1-pyrrolidyl)ethyl α-propyl-α-cyclopentylacetate

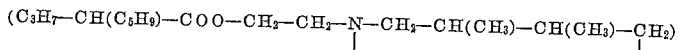

boiling point, 95 degrees centigrade at a pressure of 0.025 millimeter; $n_D^{25}$ 1.4634. Its hydrochloride has a melting point of 143–145 degrees centigrade.

92. 2 - (2,3 - dimethyl - 1 - pyrrolidyl) ethyl α-phenyl-α-(delta-2-cyclohexenyl) acetate

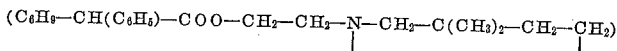

boiling point, 134 degrees centigrade at a pressure of 0.01 millimeter; $n_D^{25}$ 1.5180. Its hydrochloride has a melting point of 131.5–133.5 degrees centigrade.

93. 2 - (3,3 - dimethyl - 1 - pyrrolidyl) ethyl α-phenyl-α-(delta-2-cyclopentenyl) acetate

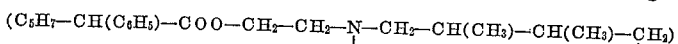

boiling point, 133 degrees centigrade at a pressure of 0.04 millimeter; $n_D^{25}$ 1.5179. Its hydrochloride has a melting point of 116–118 degrees centigrade.

94. 2-(3,3-dimethyl-1-pyrrolidyl)ethyl α-propyl-α-cyclopentylacetate

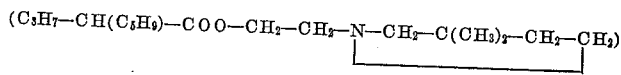

boiling point, 102 degrees centigrade at a pressure of 0.04 millimeter; $n_D^{25}$ 1.4631. Its hydrochloride has a melting point of 107.5–108.5 degrees centigrade.

95. 2 - (2,2 - dimethyl - 1 - pyrrolidyl) ethyl α-phenyl-α-(delta-2-cyclopentenyl) acetate

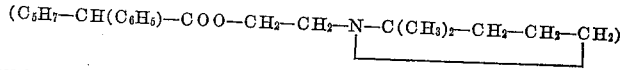

boiling point, 125 degrees centigrade at a pressure of 0.015 millimeter of mercury; $n_D^{25}$ 1.5177. Its hydrochloride has a melting point of 132–142 degrees centigrade.

96. 2 - (2,2 - dimethyl - 1 - pyrrolidyl) ethyl α-phenyl-α-(delta-2-cyclohexenyl) acetate

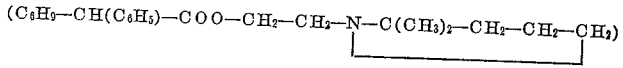

boiling point, 134 degrees centigrade at a pressure of 0.014 millimeter; $n_D^{25}$ 1.5227. Its hydrochloride has a melting point of 157–158.5 degrees centigrade.

97. 2 - (2,2 - dimethyl - 1 - pyrrolidyl) ethyl α-phenyl-α-cyclopentylacetate

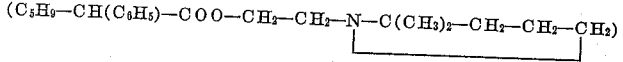

boiling point, 140 degrees centigrade at a pressure of 0.065 millimeter; $n_D^{25}$ 1.5109. Its hydrochloride has a melting point of 110–112 degrees centigrade.

98. 2 - (2,2 - dimethyl - 1 - pyrrolidyl) ethyl α-(delta - 2 - cyclohexenyl) - α - (delta - 2 - cyclopentenyl) acetate

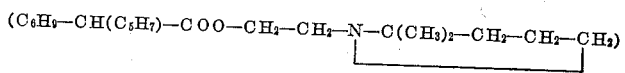

boiling point, 128 degrees centigrade at a pressure of 0.013 millimeter; $n_D^{25}$ 1.5011. Its hydrochloride has a melting point of 130.5–132 degrees centigrade.

99. 2-(2,4,4 - trimethyl - 1 - pyrrolidyl) ethyl α-phenyl-α-(delta-2-cyclohexenyl) acetate

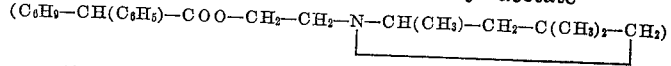

boiling point, 136 degrees centigrade at a pressure of 0.01 millimeter; $n_D^{25}$ 1.5131. Its hydrochloride has a melting point of 138–140 degrees centigrade.

100. 2-(2,4,4-trimethyl - 1 - pyrrolidyl)ethyl α-phenyl-α-(delta-2-cyclopentenyl) acetate

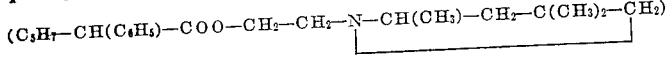

boiling point, 130 degrees centigrade at a pressure of 0.02 millimeter; $n_D^{25}$ 1.5079. Its hydrochloride has a melting point of 140–141 degrees centigrade.

101. 2-(2,4,4-trimethyl - 1 - pyrrolidyl)ethyl α-propyl-α-cyclopentylacetate

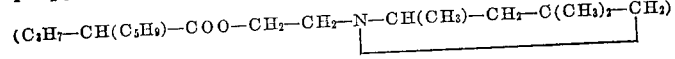

boiling point, 99 degrees centigrade at a pressure of 0.015 millimeter; $n_D^{25}$ 1.4610. Its hydrochloride has a melting point of 145.5–146.5 degrees centigrade.

102. 2-(2,4,4-trimethyl - 1 - pyrrolidyl)ethyl α-(delta-2-cyclopentenyl) - α -(delta-2-cyclohexenyl)acetate

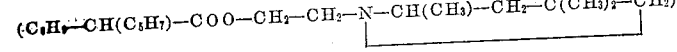

boiling point, 128 degrees centigrade at a pressure of 0.015 millimeter, $n_D^{25}$ 1.4932. Its hydrochloride has a melting point of 137–138 degrees centigrade.

103. 2-(2,2,4-trimethyl - 1 - pyrrolidyl)ethyl α-phenyl-α-(delta-2-cyclohexenyl)acetate

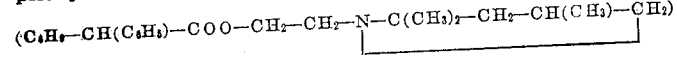

boiling point, 150 degrees centigrade at a pressure of 0.045 millimeter; $n_D^{25}$ 1.5170. Its hydrochloride has a melting point of 148.5–150 degrees centigrade.

104. 2-(2,2,4-trimethyl - 1 - pyrrolidyl)ethyl α-phenyl-α-(delta-2-cyclopentenyl) acetate

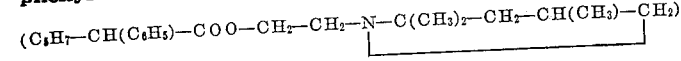

boiling point, 132 degrees centigrade at a pressure of 0.02 millimeter; $n_D^{25}$ 1.5117. Its hydrochloride has a melting point of 153–156.5 degrees centigrade.

105. 2-(2,2,4-trimethyl - 1 - pyrrolidyl)ethyl α-propyl-α-cyclopentylacetate

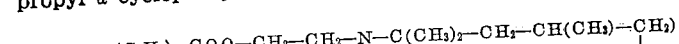

boiling point, 96 degrees centigrade at a pressure of 0.01 millimeter; $n_D^{25}$ 1.4650.

106. 2-(2,2,5-trimethyl - 1 - pyrrolidyl)ethyl α-phenyl-α-(delta-2-cyclopentenyl) acetate

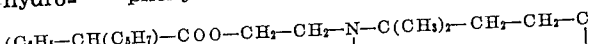

boiling point, 136 degrees centigrade at a pressure of 0.04 millimeter; $n_D^{25}$ 1.5138. Its hydrochloride has a melting point of 108–112 degrees centigrade.

107. 2-(2,2,5-trimethyl - 1 - pyrrolidyl)ethyl α-propyl-α-cyclopentylacetate

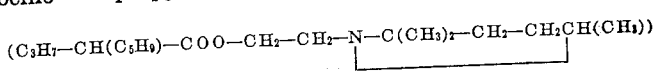

boiling point, 107 degrees centigrade at a pressure of 0.028 millimeter; $n_D^{25}$ 1.4660. Its hydrochloride has a melting point of 95–97.5 degrees centigrade.

108. 2-(2-ethyl-1-pyrrolidyl)ethyl α-phenyl-α-(delta-2-cyclopentenyl)acetate

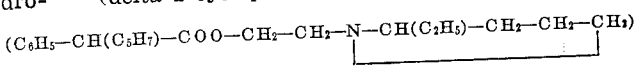

boiling point, 132 degrees centigrade at a pressure of 0.03 millimeter; $n_D^{25}$ 1.5179. Its hydrochloride has a melting point of 120–125 degrees centigrade.

109. 2-(2-ethyl-1-pyrrolidyl)ethyl α-phenyl-α-(delta-2-cyclohexenyl)acetate

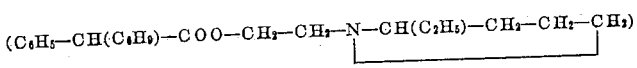

boiling point, 147 degrees centigrade at a pressure of 0.02 millimeter; $n_D^{25}$ 1.5227. Its hydrochloride has a melting point of 146.5–149 degrees centigrade.

110. 2-(2-ethyl-1-pyrrolidyl)ethyl α-propyl-α-cyclopentylacetate

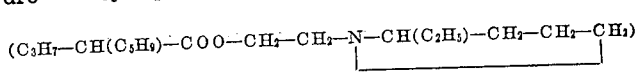

boiling point, 104 degrees centigrade at a pressure of 0.02 millimeter; $n_D^{25}$ 1.4685. Its hydrochloride has a melting point of 96.5–98.5 degrees centigrade.

111. 2-(2-ethyl-1-pyrrolidyl)ethyl α-phenyl-α-cyclopentylacetate

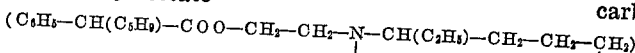

boiling point, 126 degrees centigrade at a pressure of 0.015 millimeter; $n_D^{25}$ 1.5110. Its hydrochloride has a melting point of 138–144 degrees centigrade.

112. 2-(2,4-dimethyl-3-ethyl-1-pyrrolidyl)ethyl α-propyl-α-cyclopentylacetate

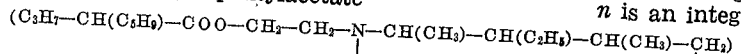

boiling point, 129 degrees centigrade at a pressure of 0.01 millimeter; $n_D^{25}$ 1.4608. Its hydrochloride has a melting point of 109–112 degrees centigrade.

Various modifications may be made in the compounds of the present invention without departing from the spirit or scope thereof, and it is to be understood that I limit myself only as defined in the appended claims.

I claim:

1. A compound selected from the group consisting of (a) (1-pyrrolidyl)alkyl esters represented by the following formula:

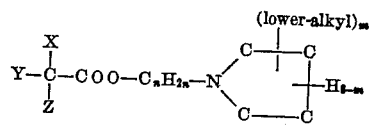

wherein X is selected from the group consisting of hydrogen and lower-alkyl radicals, Y is a monocyclic hydrocarbon radical containing a carbocyclic ring having from five to six carbon atoms, inclusive, Z is selected from the group consisting of lower-alkyl and monocyclic hydrocarbon radicals containing a carbocyclic ring having from five to six carbon atoms, inclusive, $m$ is an integer from zero to four, inclusive, and $n$ is an integer from two to four, inclusive, and (b) acid addition and (c) quaternary ammonium salts thereof.

2. 2-(2-methyl-1-pyrrolidyl)ethyl alpha-phenyl-alpha-(delta-2-cyclohexenyl)acetate.

3. 2-(2,2-dimethyl-1-pyrrolidyl)ethyl alpha-n-propyl-alpha-cyclopentylacetate hydrochloride.

4. 2-(2,2-dimethyl-1-pyrrolidyl)ethyl alpha-n-propyl-alpha-cyclopentylacetate methobromide.

5. 2-(2-methyl-1-pyrrolidyl)ethyl alpha-phenyl-alpha-cyclopentylacetate hydrochloride.

6. 2-(1-pyrrolidyl)ethyl alpha-phenyl-alpha-(delta-2-cyclopentenyl)acetate ethobromide.

EUGENE H. WOODRUFF.

References Cited in the file of this patent

UNITED STATES PATENTS

| Number | Name | Date |
|---|---|---|
| 2,541,634 | Blicke | Feb. 13, 1951 |